United States Patent
Hosseini et al.

(10) Patent No.: US 11,825,468 B2
(45) Date of Patent: Nov. 21, 2023

(54) SCHEDULING RESTRICTIONS FOR CANCELED OR CONFLICTING RESOURCES

(71) Applicant: QUALCOMM Incorporated, San Diego, CA (US)

(72) Inventors: Seyedkianoush Hosseini, San Diego, CA (US); Seyed Ali Akbar Fakoorian, San Diego, CA (US); Wei Yang, San Diego, CA (US); James Beckman, La Jolla, CA (US); Enoch Shiao-Kuang Lu, San Diego, CA (US); Peter Gaal, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/219,075

(22) Filed: Mar. 31, 2021

(65) Prior Publication Data

US 2021/0314980 A1 Oct. 7, 2021

Related U.S. Application Data

(60) Provisional application No. 63/005,111, filed on Apr. 3, 2020.

(51) Int. Cl.
*H04W 72/1268* (2023.01)
*H04W 72/0446* (2023.01)
(Continued)

(52) U.S. Cl.
CPC ... *H04W 72/1268* (2013.01); *H04W 72/0446* (2013.01); *H04W 72/21* (2023.01);
(Continued)

(58) Field of Classification Search
CPC .............. H04L 5/0048; H04L 5/0053; H04W 72/0446; H04W 72/1242; H04W 72/1257;
(Continued)

(56) References Cited

U.S. PATENT DOCUMENTS 11,357,017 B2 * 6/2022 Bagheri ............ H04W 72/1242
11,452,167 B2 * 9/2022 Yang ................. H04W 72/1268
(Continued)

OTHER PUBLICATIONS

International Search Report and Written Opinion—PCT/US2021/025415—ISA/EPO—dated Jul. 15, 2021.
(Continued)

*Primary Examiner* — Dung B Huynh
(74) *Attorney, Agent, or Firm* — Arun Swain

(57) ABSTRACT

Methods, systems, and devices for wireless communications are described. The described techniques provide for a user equipment (UE) receiving a first transmission scheduling resources for a second transmission having a first priority. The UE may determine that one or more symbols of the second transmission are to be unused due to receipt of a cancellation indication or due to identifying a conflict, for example, with higher priority resources. Based on determining that the symbols are to be unused, the UE may determine that the base station will not reschedule the unused resources for another transmission, for example, having the first priority. The UE and the base station may communicate based on the determination.

27 Claims, 14 Drawing Sheets

(51) Int. Cl.
*H04W 72/21* (2023.01)
*H04W 72/23* (2023.01)
*H04W 72/50* (2023.01)
*H04W 72/566* (2023.01)

(52) U.S. Cl.
CPC ......... *H04W 72/23* (2023.01); *H04W 72/535* (2023.01); *H04W 72/569* (2023.01)

(58) Field of Classification Search
CPC ......... H04W 72/1268; H04W 72/1284; H04W 72/1289; H04W 72/14
See application file for complete search history.

(56) References Cited

U.S. PATENT DOCUMENTS

| | | | | |
|---|---|---|---|---|
| 2017/0230939 | A1* | 8/2017 | Rudolf | H04W 88/02 |
| 2018/0279229 | A1* | 9/2018 | Dinan | H04W 52/367 |
| 2019/0230689 | A1* | 7/2019 | Cao | H04L 27/2602 |
| 2020/0008216 | A1* | 1/2020 | Iyer | H04W 72/042 |
| 2020/0119895 | A1* | 4/2020 | Choi | H04L 5/0007 |
| 2020/0170030 | A1* | 5/2020 | Sano | H04W 72/1268 |
| 2020/0313793 | A1* | 10/2020 | Jung | H04L 5/0094 |
| 2020/0359388 | A1* | 11/2020 | He | H04L 69/16 |
| 2020/0389876 | A1* | 12/2020 | Islam | H04W 72/042 |
| 2021/0014866 | A1* | 1/2021 | Shi | H04W 80/08 |
| 2021/0100012 | A1* | 4/2021 | Miao | H04W 72/044 |
| 2021/0144708 | A1* | 5/2021 | Wang | H04W 72/1289 |
| 2021/0168783 | A1* | 6/2021 | Islam | H04W 72/042 |
| 2021/0168848 | A1* | 6/2021 | Chatterjee | H04W 72/1242 |
| 2021/0218503 | A1* | 7/2021 | Babaei | H04L 1/1812 |
| 2021/0219276 | A1* | 7/2021 | Liu | H04W 72/042 |
| 2021/0266126 | A1* | 8/2021 | Sun | H04L 5/0048 |
| 2021/0307016 | A1* | 9/2021 | Takeda | H04W 72/0446 |
| 2021/0337569 | A1* | 10/2021 | Fu | H04L 5/0064 |
| 2021/0345366 | A1* | 11/2021 | Ying | H04L 1/1893 |
| 2021/0377944 | A1* | 12/2021 | Noh | H04W 72/0453 |
| 2021/0385831 | A1* | 12/2021 | Nogami | H04L 5/0094 |
| 2022/0022148 | A1* | 1/2022 | Shen | H04L 5/0091 |
| 2022/0052727 | A1* | 2/2022 | Sun | H04L 5/0053 |
| 2022/0086872 | A1* | 3/2022 | Shimezawa | H04L 5/0039 |
| 2022/0095144 | A1* | 3/2022 | Ren | H04J 11/003 |
| 2022/0124698 | A1* | 4/2022 | Noh | H04W 72/10 |
| 2022/0132533 | A1* | 4/2022 | Taherzadeh Boroujeni | H04W 72/1268 |
| 2022/0159683 | A1* | 5/2022 | Islam | H04W 72/042 |
| 2022/0173867 | A1* | 6/2022 | Nogami | H04L 5/001 |
| 2022/0191839 | A1* | 6/2022 | Ying | H04L 5/0091 |
| 2022/0191893 | A1* | 6/2022 | Miao | H04B 7/15542 |
| 2022/0200767 | A1* | 6/2022 | Park | H04B 7/0478 |
| 2022/0217708 | A1* | 7/2022 | Li | H04L 5/0053 |
| 2022/0217750 | A1* | 7/2022 | Liu | H04W 72/1284 |
| 2022/0272557 | A1* | 8/2022 | Liu | H04W 76/20 |
| 2022/0279447 | A1* | 9/2022 | Zhou | H04W 68/00 |
| 2022/0308153 | A1* | 9/2022 | Fakoorian | H04W 64/00 |
| 2022/0418000 | A1* | 12/2022 | Zhang | H04L 5/0053 |
| 2023/0006798 | A1* | 1/2023 | Lee | H04L 1/1607 |
| 2023/0076897 | A1* | 3/2023 | Svedman | H04W 72/23 |
| 2023/0088996 | A1* | 3/2023 | Abdelghaffar | H04L 5/1469 370/278 |
| 2023/0134743 | A1* | 5/2023 | Åström | H04L 5/0035 370/329 |
| 2023/0179391 | A1* | 6/2023 | He | H04L 5/1469 370/235 |

OTHER PUBLICATIONS

Panasonic: "On Inter UE Tx Prioritization/Multiplexing Enhancements for NR URLLC", 3GPP Draft, 3GPP TSG RAN WG1 #99, R1-1912751, vol. RAN WG1, No. Reno, USA, Nov. 8, 2019 (Nov. 8, 2019), XP051820187, 8 Pages, Retrieved from the Internet: URL: https://ftp.3gpp.org/tsg_ran/WG1_RL1/TSGR1_99/Docs/R1-1912751. zip. p. 1-p. 6.

Qualcomm Incorporated: "UL Inter UE Tx Prioritization/Multiplexing", 3GPP Draft, 3GPP TSG-RAN WG1 #94, R1-1809458, UL inter UE Tx Prioritization/Multiplexing, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20-Aug. 24, 2018, Aug. 17, 2018 (Aug. 17, 2018), XP051516823, 12 pages, Retrieved from the Internet: URL: http://www.3gpp.org/ftp/tsg%5Fran/WG1%5FRL1/TSGR1%5F94/Docs/R1%2D1809458%2Ezip. [retrieved on Aug. 17, 2018]. figure 1 tables I, II sections 2-9.

Qualcomm Incorporated: "Uplink Inter-UE Tx Multiplexing and Prioritization", 3GPP Draft, 3GPP TSG-RAN WG1 #98b, R1-1911122, Uplink Inter-UE Tx Multiplexing and Prioritization, 3rd Generation Partnership Project (3GPP), Mobile Competence Centre, 650, Route Des Lucioles, F-06921, Sophia-Antipolis Cedex, vol. RAN WG1, No. Chongqing, China, Oct. 14-Oct. 20, 2019, Oct. 8, 2019 (Oct. 8, 2019), XP051809292, 9 pages, Retrieved from the Internet: URL:https://ftp.3gpp.org/tsg_ran/WG1_RL1/TSGR1_98b/Docs/R1-1911122. zip, R1-1911122, Uplink Inter-UE Tx Multiplexing and Prioritization. docx [retrieved on Oct. 8, 2019], Section "2.3 Applicability of UL Cancellation Indication to Uplink channels". paragraph 2.2, figure 3, The whole document.

Vivo: "Summary of Email Discussion [100e-NR-L1enh URLLC-InterUE-02]", 3GPP Draft, 3GPP TSG RAN WG1 #100, R1-2001291, vol. RAN WG1, No. e-Meeting, Mar. 5, 2020 (Mar. 5, 2020), XP051860384, 22 Pages, Retrieved from the Internet: URL: https://ftp.3gpp.org/tsg_ran/WG1_RL1/TSGR1_100_e/Docs/R1-2001291. zip. p. 7 p. 15.

* cited by examiner

SCHEDULING RESTRICTIONS FOR CANCELED OR CONFLICTING RESOURCES

CROSS REFERENCE

The present Application for Patent claims the benefit of U.S. Provisional Patent Application No. 63/005,111 by HOSSEINI et al., entitled "SCHEDULING RESTRICTIONS FOR CANCELED OR CONFLICTING RESOURCES," filed Apr. 3, 2020, assigned to the assignee hereof, and expressly incorporated by reference herein.

FIELD OF TECHNOLOGY

The following relates generally to wireless communications and more specifically to scheduling restrictions for canceled or conflicting resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support scheduling restrictions for canceled or conflicting resources. One or more user equipments (UEs) operating in accordance with some radio access technologies may be subject to conditions in which some scheduled transmissions may be canceled, such as to reschedule unused or conflicted symbols. For example, some scheduled resources may be scheduled as a result of the UE's communications having a lower priority than other communications, for example, than other communications of another UE. Further, a UE may be scheduled with channels having different priorities, and when the channels conflict (e.g., overlap), then the resources of a lower priority channel may be canceled.

Generally, the described techniques provide for a UE receiving a first transmission scheduling resources for a second transmission having a first priority. The UE may determine that one or more symbols of the second transmission are to be unused due to receipt of a cancellation indication or due to identifying a conflict with higher priority resources. Based on determining that the symbols are to be unused, the UE may determine that the base station will not reschedule the unused resources for another transmission, for example, having the first priority or a priority lower than the first priority. The UE and the base station may communicate based on the determination, including in some examples communicating over at least some of the resources (e.g., the resources that would be unused resources for another transmission having the first priority) for another transmission having a second priority higher than the first priority.

A method for wireless communication at a UE is described. The method may include receiving, from a base station, a first transmission scheduling resources for a second transmission, determining that one or more symbols of the scheduled resources are to be unused for the second transmission based on a cancellation indication received from the base station, determining that the unused one or more symbols will not be scheduled by the base station as resources in a third transmission based on determining that the one or more symbols are to be unused, and communicating with the base station based on determining that the unused one or more symbols will not be scheduled by the base station as resources in the third transmission.

An apparatus for wireless communication at a UE is described. The apparatus may include a processor, memory coupled with the processor, and instructions stored in the memory. The instructions may be executable by the processor to cause the apparatus to receive, from a base station, a first transmission scheduling resources for a second transmission, determine that one or more symbols of the scheduled resources are to be unused for the second transmission based on a cancellation indication received from the base station, determine that the unused one or more symbols will not be scheduled by the base station as resources in a third transmission based on determining that the one or more symbols are to be unused, and communicate with the base station based on determining that the unused one or more symbols will not be scheduled by the base station as resources in the third transmission.

Another apparatus for wireless communication at a UE is described. The apparatus may include means for receiving, from a base station, a first transmission scheduling resources for a second transmission, determining that one or more symbols of the scheduled resources are to be unused for the second transmission based on a cancellation indication received from the base station, determining that the unused one or more symbols will not be scheduled by the base station as resources in a third transmission based on determining that the one or more symbols are to be unused, and communicating with the base station based on determining that the unused one or more symbols will not be scheduled by the base station as resources in the third transmission.

A non-transitory computer-readable medium storing code for wireless communication at a UE is described. The code may include instructions executable by a processor to receive, from a base station, a first transmission scheduling resources for a second transmission, determine that one or more symbols of the scheduled resources are to be unused for the second transmission based on a cancellation indication received from the base station, determine that the unused one or more symbols will not be scheduled by the base station as resources in a third transmission based on determining that the one or more symbols are to be unused, and communicate with the base station based on determining that the unused one or more symbols will not be scheduled by the base station as resources in the third transmission.

Some examples of the method, apparatuses, and non-transitory computer-readable medium described herein may further include operations, features, means, or instructions for, where the second transmission is associated with a first priority, receiving, from the base station, a fourth transmission scheduling at least one symbol of the one or more symbols as resources for the third transmission associated with a second priority different than the first priority, where communicating with the base station may be based on receiving the fourth transmission.

Some examples of the method, apparatuses, and non-transitory computer-readable medium described herein may further include operations, features, means, or instructions for the second transmission being a first physical uplink shared channel transmission or a first sounding reference signal transmission and where determining that the unused one or more symbols will not be scheduled by the base station comprises determining that the unused one or more symbols will not be scheduled for a second physical uplink shared channel transmission or a second sounding reference signal transmission.

Some examples of the method, apparatuses, and non-transitory computer-readable medium described herein may further include operations, features, means, or instructions for determining to not communicate using the scheduled resources of the third transmission based on the second priority being lower than the first priority, where communicating with the base station may be based on determining to not communicate using the scheduled resources of the third transmission.

Some examples of the method, apparatuses, and non-transitory computer-readable medium described herein may further include operations, features, means, or instructions for determining to communicate using the scheduled resources of the third transmission based on the second priority being higher than the first priority, where communicating with the base station may be based on determining to communicate using the scheduled resources of the third transmission.

In some examples of the method, apparatuses, and non-transitory computer-readable medium described herein, the fourth transmission includes a downlink grant scheduling the resources for a physical downlink shared channel and the second priority corresponds to a physical uplink control channel allocated for transmitting feedback associated with the physical downlink shared channel.

In some examples of the method, apparatuses, and non-transitory computer-readable medium described herein, the third transmission includes a physical uplink shared channel, a physical uplink control channel, or one or more sounding reference signals.

In some examples of the method, apparatuses, and non-transitory computer-readable medium described herein, the fourth transmission includes an uplink grant scheduling the resources for a physical uplink shared channel and the second priority may be associated with the physical uplink shared channel.

Some examples of the method, apparatuses, and non-transitory computer-readable medium described herein may further include operations, features, means, or instructions for determining that the second transmission may be an uplink transmission and the one or more symbols include flexible symbols scheduled as uplink symbols for the uplink transmission, where the UE determines that the unused one or more symbols will not be scheduled based on determining that the second transmission may be the uplink transmission and the one or more symbols include flexible symbols.

Some examples of the method, apparatuses, and non-transitory computer-readable medium described herein may further include operations, features, means, or instructions for receiving, from the base station, the cancellation indication canceling at least one symbol of a slot including the one or more symbols of the second transmission, where determining that the one or more symbols of the scheduled resources may be to be unused for the second transmission may be based on receiving the cancellation indication.

Some examples of the method, apparatuses, and non-transitory computer-readable medium described herein may further include operations, features, means, or instructions for determining the one or more symbols positioned in the second transmission after the at least one symbol of the slot, where determining that the one or more symbols of the scheduled resources may be to be unused for the second transmission may be based on determining the one or more symbols positioned in the second transmission after the at least one symbol in the cancellation indication.

In some examples of the method, apparatuses, and non-transitory computer-readable medium described herein, the second transmission may be an uplink transmission and the cancellation indication may be an uplink cancellation indication.

In some examples of the method, apparatuses, and non-transitory computer-readable medium described herein, the second transmission may be a downlink transmission and the cancellation indication may be a downlink cancellation indication.

Some examples of the method, apparatuses, and non-transitory computer-readable medium described herein may further include operations, features, means, or instructions for determining that at least a portion of the resources of the second transmission and the higher priority resources scheduled by the base station may be overlapping, where determining that the one or more symbols of the scheduled resources may be to be unused for the second transmission may be based on determining that the at least the portion of the resources of the second transmission and the higher priority resources scheduled by the base station may be overlapping.

Some examples of the method, apparatuses, and non-transitory computer-readable medium described herein may further include operations, features, means, or instructions for determining the one or more symbols of the second transmission positioned in the second transmission after at least one symbol of the second transmission that may be overlapping with the resources of the higher priority resources, where determining that the one or more symbols of the scheduled resources may be to be unused for the second transmission may be based on determining the one or more symbols of the second transmission.

In some examples of the method, apparatuses, and non-transitory computer-readable medium described herein, the second transmission corresponds to a physical uplink control channel or a physical uplink shared channel, and the higher priority resources correspond to resources of a higher priority physical uplink control channel compared to the physical uplink control channel or a higher priority physical uplink shared channel compared to the physical uplink shared channel.

In some examples of the method, apparatuses, and non-transitory computer-readable medium described herein, determining that the unused one or more symbols will not be scheduled further may include operations, features, means, or instructions for determining that the unused one or more symbols will not be scheduled by the base station based on a capability of the UE.

A method of wireless communications at a base station is described. The method may include transmitting, to a UE, a first transmission scheduling resources for a second transmission, determining that one or more symbols of the scheduled resources are to be unused for the second transmission based on a cancellation indication transmitted by the base station, determining that the unused one or more symbols will not be scheduled in a third transmission based on determining that the one or more symbols are to be unused, and communicating with the UE based on determining that the unused one or more symbols will not be scheduled as resources in the third transmission.

An apparatus for wireless communications at a base station is described. The apparatus may include a processor, memory coupled with the processor, and instructions stored in the memory. The instructions may be executable by the processor to cause the apparatus to transmit, to a UE, a first transmission scheduling resources for a second transmission, determine that one or more symbols of the scheduled resources are to be unused for the second transmission based on a cancellation indication transmitted by the base station, determine that the unused one or more symbols will not be scheduled in a third transmission based on determining that the one or more symbols are to be unused, and communicate with the UE based on determining that the unused one or more symbols will not be scheduled as resources in the third transmission.

Another apparatus for wireless communications at a base station is described. The apparatus may include means for transmitting, to a UE, a first transmission scheduling resources for a second transmission, determining that one or more symbols of the scheduled resources are to be unused for the second transmission based on a cancellation indication transmitted by the base station, determining that the unused one or more symbols will not be scheduled in a third transmission based on determining that the one or more symbols are to be unused, and communicating with the UE based on determining that the unused one or more symbols will not be scheduled as resources in the third transmission.

A non-transitory computer-readable medium storing code for wireless communications at a base station is described. The code may include instructions executable by a processor to transmit, to a UE, a first transmission scheduling resources for a second transmission, determine that one or more symbols of the scheduled resources are to be unused for the second transmission based on a cancellation indication transmitted by the base station, determine that the unused one or more symbols will not be scheduled in a third transmission based on determining that the one or more symbols are to be unused, and communicate with the UE based on determining that the unused one or more symbols will not be scheduled as resources in the third transmission.

Some examples of the method, apparatuses, and non-transitory computer-readable medium described herein may further include operations, features, means, or instructions for, where the second transmission is associated with a first priority, transmitting, to the UE, a fourth transmission scheduling at least one symbol of the one or more symbols as resources for the third transmission associated with a second priority different than the first priority, where communicating with the base station may be based on receiving the fourth transmission.

Some examples of the method, apparatuses, and non-transitory computer-readable medium described herein may further include operations, features, means, or instructions for the second transmission being a first physical uplink shared channel transmission or a first sounding reference signal transmission and where determining that the unused one or more symbols will not be scheduled by the base station comprises determining that the unused one or more symbols will not be scheduled for a second physical uplink shared channel transmission or a second sounding reference signal transmission.

Some examples of the method, apparatuses, and non-transitory computer-readable medium described herein may further include operations, features, means, or instructions for determining to not communicate using the scheduled resources of the third transmission based on the second priority being lower than the first priority, where communicating with the base station may be based on determining to not communicate using the scheduled resources of the third transmission.

Some examples of the method, apparatuses, and non-transitory computer-readable medium described herein may further include operations, features, means, or instructions for determining to communicate using the scheduled resources of the third transmission based on the second priority being higher than the first priority, where communicating with the base station may be based on determining to communicate using the scheduled resources of the third transmission.

In some examples of the method, apparatuses, and non-transitory computer-readable medium described herein, the fourth transmission includes a downlink grant scheduling the resources for a physical downlink shared channel and the second priority corresponds to a physical uplink control channel allocated for transmitting feedback associated with the physical downlink shared channel.

In some examples of the method, apparatuses, and non-transitory computer-readable medium described herein, the third transmission includes a physical uplink shared channel, a physical uplink control channel, or one or more sounding reference signals.

In some examples of the method, apparatuses, and non-transitory computer-readable medium described herein, the fourth transmission includes an uplink grant scheduling the resources for a physical uplink shared channel and the second priority may be associated with the physical uplink shared channel.

Some examples of the method, apparatuses, and non-transitory computer-readable medium described herein may further include operations, features, means, or instructions for determining that the second transmission may be an uplink transmission and the one or more symbols include flexible symbols scheduled as uplink symbols for the uplink transmission, where the base station determines that the unused one or more symbols will not be scheduled based on determining that the second transmission may be the uplink transmission and the one or more symbols include flexible symbols.

Some examples of the method, apparatuses, and non-transitory computer-readable medium described herein may further include operations, features, means, or instructions for transmitting, to the UE, the cancellation indication canceling at least one symbol of a slot including the one or more symbols of the second transmission where determining that the one or more symbols of the scheduled resources may be to be unused for the second transmission may be based on receiving the cancellation indication.

Some examples of the method, apparatuses, and non-transitory computer-readable medium described herein may further include operations, features, means, or instructions for determining the one or more symbols positioned in the second transmission after the at least one symbol of the slot, where determining that the one or more symbols of the scheduled resources may be to be unused for the second transmission may be based on determining the one or more symbols positioned in the second transmission after the at least one symbol in the cancellation indication.

In some examples of the method, apparatuses, and non-transitory computer-readable medium described herein, the second transmission may be an uplink transmission and the cancellation indication may be an uplink cancellation indication.

In some examples of the method, apparatuses, and non-transitory computer-readable medium described herein, the second transmission may be a downlink transmission and the cancellation indication may be a downlink cancellation indication.

Some examples of the method, apparatuses, and non-transitory computer-readable medium described herein may further include operations, features, means, or instructions for determining that at least a portion of the resources of the second transmission and the higher priority resources scheduled by the base station may be overlapping, where determining that the one or more symbols of the scheduled resources may be to be unused for the second transmission may be based on determining that the at least the portion of the resources of the second transmission and the higher priority resources scheduled by the base station may be overlapping.

Some examples of the method, apparatuses, and non-transitory computer-readable medium described herein may further include operations, features, means, or instructions for determining the one or more symbols of the second transmission positioned in the second transmission after at least one symbol of the second transmission that may be overlapping with the resources of the higher priority resources, where determining that the one or more symbols of the scheduled resources may be to be unused for the second transmission may be based on determining the one or more symbols of the second transmission.

In some examples of the method, apparatuses, and non-transitory computer-readable medium described herein, the second transmission corresponds to a physical uplink control channel or a physical uplink shared channel, and the higher priority resources correspond to resources of a higher priority physical uplink control channel compared to the physical uplink control channel or a higher priority physical uplink shared channel compared to the physical uplink shared channel.

In some examples of the method, apparatuses, and non-transitory computer-readable medium described herein, determining that the unused one or more symbols will not be scheduled further may include operations, features, means, or instructions for determining that the unused one or more symbols will not be scheduled based on a capability of the UE.

DETAILED DESCRIPTION

Figure 1:
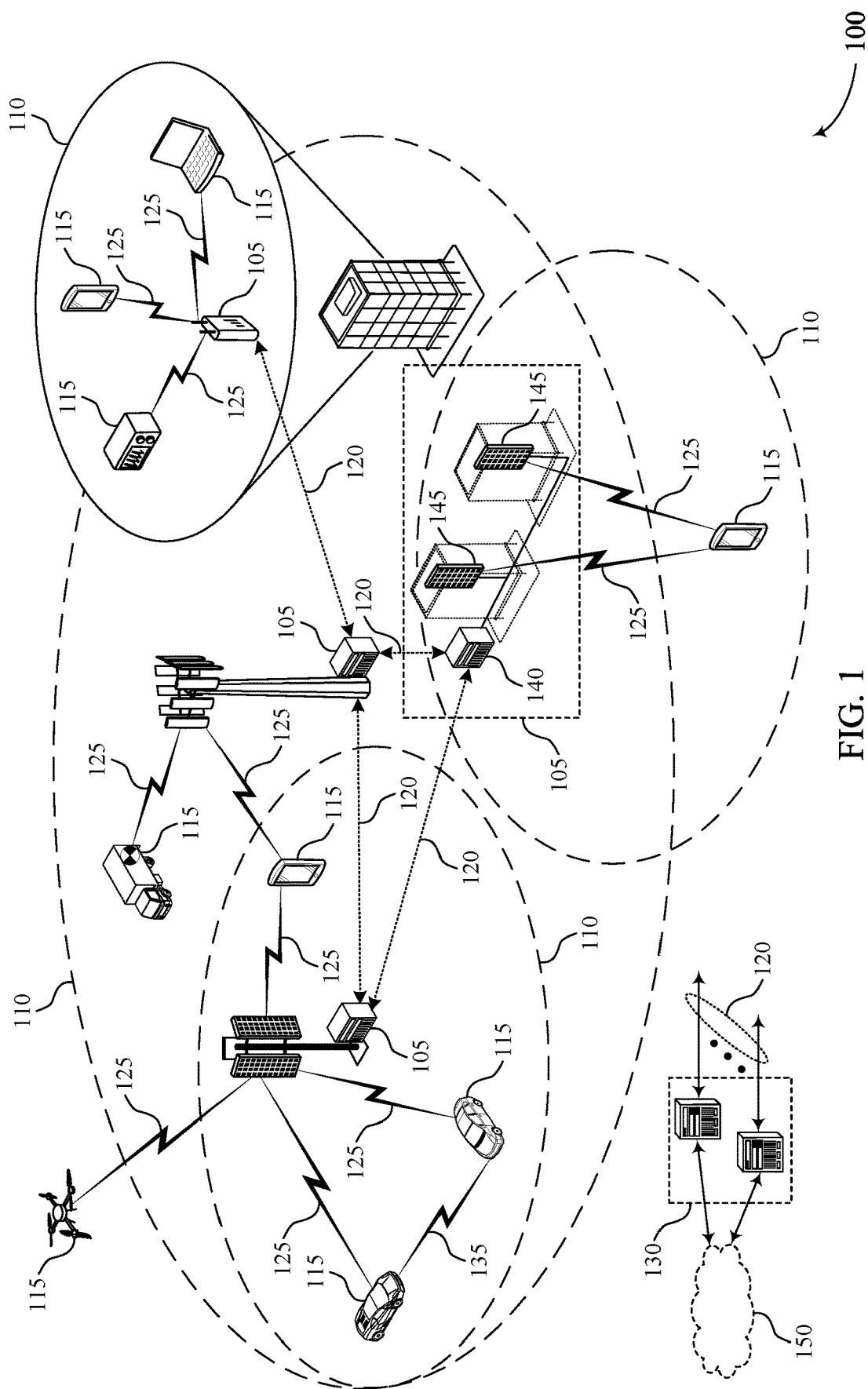
FIG. 1 illustrates an example of a system for wireless communications that supports scheduling restrictions for canceled or conflicting resources in accordance with aspects of the present disclosure.

User equipments (UEs) operating in accordance with some radio access technologies may be subject to conditions in which previously-scheduled symbols may be unused, for example based on being canceled or conflicted. For example, a UE may receive an uplink cancellation indication (ULCI) (also referred to as uplink preemption indication (ULPI), which may cancel a window that overlaps with at least some of the previously scheduled symbols. The uplink cancellation indication may be transmitted by a base station to prioritize a higher priority transmission by another UE over a lower priority transmission by a given UE (e.g., an ultra-reliable low latency communication (URLLC) over an enhanced mobile broadband (eMBB) communication). In another example, a UE may be scheduled with uplink channels having different priorities. More particularly, a UE may be scheduled with a first physical uplink shared channel (PUSCH) having a higher priority and a second PUSCH having a lower priority (e.g., as examples of two or more priorities). If these two channels at least partially overlap, then the resources of the low priority PUSCH may be unused (e.g., may be canceled or conflicted out). In either of these conditions, some symbols that are not indicated as canceled or are not overlapping may also be dropped (e.g., go unused) as the remaining symbols in the scheduled resources.

The techniques described herein provide for constraints on scheduling these unused—for example canceled or conflicting symbols (collectively herein referred to as "unused"). More particularly, if symbols are indicated as canceled or unused due to a collision, rescheduling these resources may increase complexity and overhead at the UE. Accordingly, to limit the complexity and the overhead for the UE, when one or more symbols are unused due to a collision with another channel or due to a cancellation indication, the techniques described herein may limit the ability of the base station to reschedule these resources for another transmission, or the UE may utilize priorities to determine whether to reuse the unused resources in accordance with, for example, a received scheduling transmission from the base station.

For example, when the UE determines that one or more symbols of a scheduled channel with a first priority are to be unused due to a cancellation indication or due to an identified conflict with a higher priority channel, then the UE may determine that the base station will not reschedule the unused symbols for another transmission with the first priority or a priority that is lower than the first priority. That is, in accordance with some techniques, the UE may be configured such that the base station will not reschedule these resources with the same priority. In some examples, the UE may assume that the resources will not be rescheduled for a channel having a lower priority than the channel having the canceled or overlapping channels. Similarly, the UE may assume that the rescheduled resources are used for a channel having a higher priority than the channel with the canceled or overlapping resources. In some cases, the UE may compare a priority of the channel including the unused symbols to the priority of a channel scheduled by the base station and including unused symbols to determine whether to communicate using the unused symbols. If the priority of the channel having the symbols unused is greater than the priority of the channel being scheduled by the base station, then the UE may determine to not communicate on the unused symbols. Otherwise, if the priority of the channel having the symbols unused is lower than the priority of the channel being scheduled by the base station, then the UE may determine to communicate on the unused symbols in accordance with the scheduling indication received from the base station to favor the higher priority communication. In some cases, whether the UE uses the unused symbols for the new transmission or not may depend on a capability of the UE.

Particular aspects of the subject matter described herein may be implemented to realize one or more advantages. The described techniques may support improvements in the channel priority or resource cancellation framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described to wireless communications systems illustrating unused symbol scheduling restrictions and process flow diagrams. Aspects of the disclosure are further illustrated by and described with reference to apparatus diagrams, system diagrams, and flowcharts that relate to scheduling restrictions for canceled or conflicting resources.

FIG. 1 illustrates an example of a wireless communications system 100 that supports scheduling restrictions for canceled or conflicting resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support scheduling communication resources for the UE 115 then subsequently cancelling the scheduled resources (e.g., using a ULCI). Further, the wireless communications systems 100 may support scheduling multiple channels for a UE 115, and the multiple channels may have different priorities. When these multiple channels have at least partially overlapping resources (e.g., when a high priority PUSCH overlaps with a low priority PUSCH), then the UE 115 may determine that the resources associated with the low priority PUSCH are to be unused. In either case, some of the symbols that are determined to be unused are not explicitly indicated by the cancellation indication or are not the symbols that are overlapping with the high priority channel. However, according to some specifications, the UE 115 may still determine that these remaining symbols (after the canceled or overlapping symbols) are to be unused.

The techniques described herein provide for constraints on scheduling these unused (e.g., remaining) symbols. More particularly, if symbols remaining after the symbols indicated by the cancellation indication or the symbols remaining after the overlapping symbols are rescheduled, then complexity and overhead at a UE 115 may be increased. The techniques described herein may decrease or limit the potential complexity and overhead. In one example, the UE 115 may identify that these symbols are to be unused and determine that a base station 105 will not reschedule these resources for another transmission. That is, the base station 105 may be prevented from rescheduling these symbols as resources for another transmission in some cases. The ability to reschedule the unused resources may be dependent on the capability of the UE 115. In some examples, the UE 115 may assume that the unused resources will not be rescheduled for a transmission having a lower priority than the channel having the canceled or overlapping resources.

Figure 2:
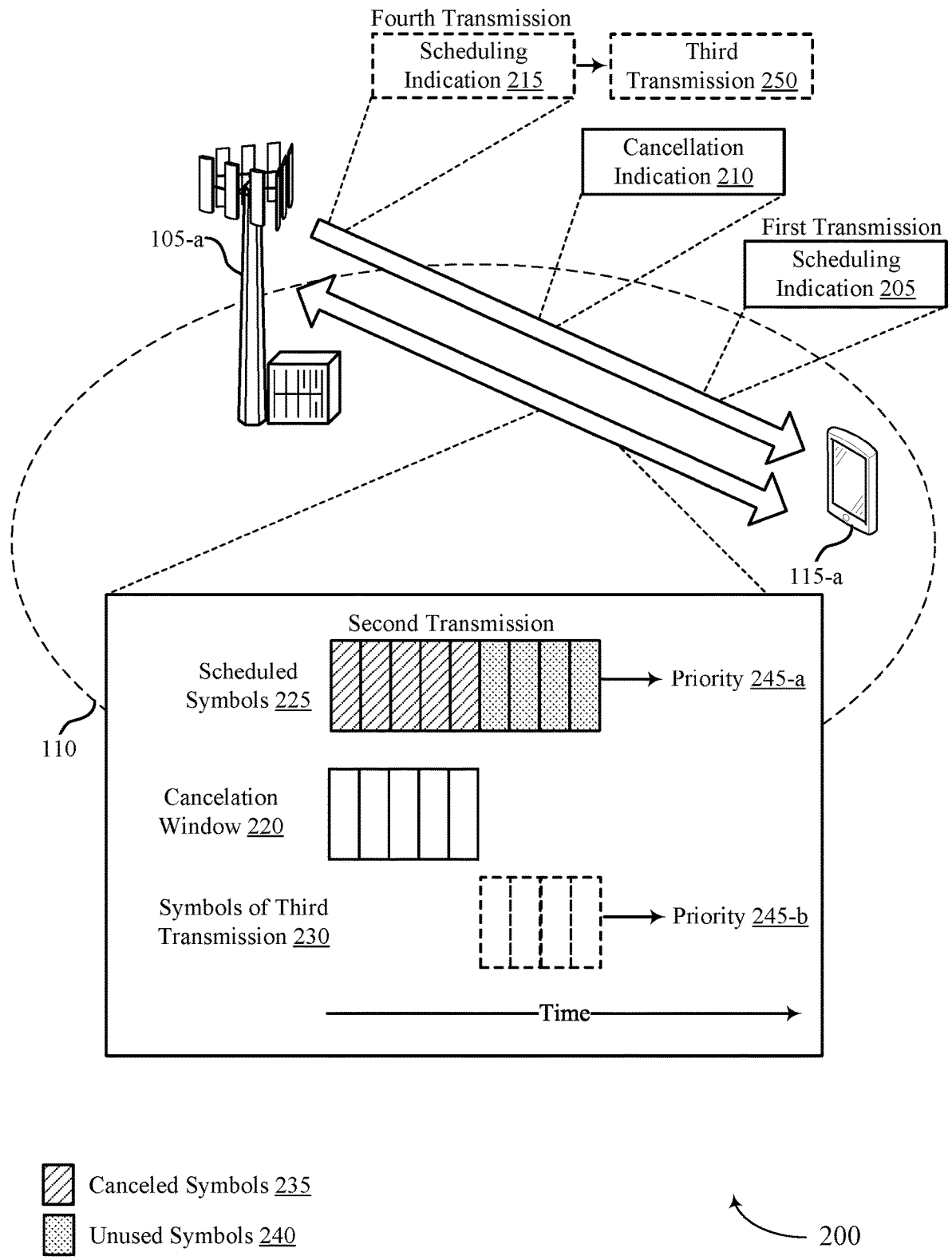
FIG. 2 illustrates an example of a wireless communications systems that supports scheduling restrictions for canceled or conflicting resources in accordance with aspects of the present disclosure.

FIG. 2 illustrates an example of a wireless communications system 200 that supports scheduling restrictions for canceled or conflicting resources in accordance with aspects of the present disclosure. In some examples, wireless communications system 200 may implement aspects of wireless communications system 100. The wireless communications system 200 includes a base station 105-a and a UE 115-a, which may be examples of the corresponding devices of FIG. 1. The base station 105-a may communicate with UEs 115 in a geographic coverage area 110 of the base station 105-a, as described with respect to FIG. 1. The base station 105-a may transmit a first transmission including a scheduling indication 205 to schedule a communication channel for the UE 115-a. The scheduling indication 205 may be an example a downlink or uplink grant, which may be included in downlink control information, uplink control information, etc. of corresponding channels. The channel may be scheduled in accordance with a semi-static grant or configured grant. The scheduled communication channel may be an example of a physical downlink shared channel (PDSCH), a physical uplink shared channel (PUSCH), a physical downlink control channel (PDCCH), or a physical uplink control channel (PUCCH), or one or more sounding reference signals (SRSs) and may include scheduled symbols 225 as resources for the channel.

Subsequently, the base station 105-a may transmit a cancellation indication 210 canceling at least a portion of the resources of the scheduled channel. For example, the cancellation indication 210 may indicate a cancellation window 220 including a set of symbols corresponding to the scheduled channel. In some examples, the cancellation indication 210 is an ULCI or ULPI for cancelling uplink resources or a cancellation indication that cancels scheduled downlink resources (e.g., a downlink cancellation indication (DLCI)).

The base station 105-a may cancel uplink resources to avoid interference with resources allocated for another UE 115 and having higher priority communication requirements. For example, the scheduled transmission including the scheduled symbols 225 may correspond to eMBB communications. The base station 105-a may subsequently schedule another UE 115 with a URLLC requirements that conflict with the scheduled resources of the UE 115-a. Accordingly, to satisfy the high reliability targets for URLLC communications, the base station 105-a may transmit the cancellation indication 210 canceling the lower reliability eMBB communication (e.g., the second transmission) to reduce or prevent interference. The base station 105-a may use DCI 2-4 to indicate to various eMBB UEs (e.g., UE 115-a) to cancel at least a portion of its scheduled transmission (e.g., that overlaps with the urgent URLLC transmission from other UEs 115), which may affect eMBB PUSCH/SRS transmissions.

An ULCI (and other types of cancellation indications) may indicate a time window (e.g., cancellation window 220) starting from Tproc, 2+d symbols after the ending control resource set (CORESET) carrying the ULCI DCI. Some symbols inside the window may be indicated as canceled using a bitmap. When the scheduled transmission (e.g., the second transmission) is an SRS, the cancellation may be symbol by symbol (e.g., the symbols that are indicated may be canceled). For a PUSCH resource cancellation, at least one symbol may be indicated as canceled, but the UE 115-a may not transmit the other symbols after the canceled symbols. That is, cancellation resume may not be supported, and the remaining symbols may be unused. This is illustrated by the canceled symbols 235 (which may be indicated by the cancellation indication 210) and the unused symbols

240. Based on receiving the cancellation indication, the UE 115-*a* may determine that one or more symbols are to be unused for the second transmission.

According to techniques described herein, the UE 115-*a* may assume that the base station 105-*a* will not transmit another scheduling indication 215 scheduling a third transmission 250 on the canceled symbols 235 and/or the unused symbols 240 (collectively unused symbols). That is, the UE 115-*a* may determine that the unused one or more symbols will not be scheduled by the base station 105-*a* as resources in a third transmission 250 based at least in part on determining that the symbols are unused (e.g., unused symbols 240). Accordingly, the base station may not transmit the scheduling indication 215 (fourth transmission) scheduling the third transmission 250.

Further, the base station 105-*a* may be configured such that the base station 105-*a* will not reschedule the resources of the unused symbols 240, unless the new channel is associated with a higher priority (e.g., priority 245-*b*) than the channel associated with the unused symbols (e.g., the second transmission with priority 245-*a*). Accordingly, the UE 115 may assume that any received grant that reschedules the unused symbols 240 will have a higher priority, and the UE 115-*a* may assume that it will not receive a grant scheduling a channel having lower priority that uses the unused symbols 240. For example, if an ULCI cancels the resource associated with a low priority PUSCH, then the UE 115-*b* may assume that it will not receive a grant from the base station 105-*a* scheduling another low priority PUSCH (or another low priority channel) using the unused symbols. Further, the UE 115-*a* may also assume that it will not receive a grant scheduling the resources for a channel having the same priority as the second transmission.

However, in some cases, the base station 105-*a* may transmit a scheduling indication 215 to schedule the third transmission having symbols 230 that may include one or more of the unused symbols 240 (or canceled symbols 235). To determine whether to communicate using the resources indicated by the scheduling indication 215 UE 115-*a* may consider priorities 245 associated with the scheduled transmission and the priorities associated with the third transmission being scheduled by the new scheduling indication 215. For example, the second transmission may correspond to a low priority PUSCH, and the third transmission may be a higher priority PUSCH. Based on the third transmission having a higher priority, the UE 115-*a* may determine to communicate using the resources of the third transmission (e.g., the symbols 230). However, if the priority 245-*b* is lower than the priority 245-*a*, then the UE 115-*a* may determine to not communicate using the resources of the third transmission.

The priorities 245 may be dependent on the scheduling indications 205 and 215. For example, a priority of a PUSCH may be indicated by downlink control information scheduling the PUSCH. Further, the priority of a PDSCH may be based on the priority of a PUCCH carrying or scheduled to carry the feedback corresponding to the PDSCH. For example, if the symbols 230 of the third transmission 250 correspond to a PUCCH, and the PUCCH is associated with a downlink grant scheduling the corresponding PDSCH is indicated to be of high priority, then the UE 115-*a* may determine to use the symbols 230 (e.g., the scheduling restriction is not applied). For example, dynamically granted PUSCH may be high or low priority, which is indicated by the scheduling downlink control information. Further, PUCCH carrying HARQ-ACK feedback (acknowledgement (ACK) or negative acknowledgment (NACK)) may have a high or low priority, which may be indicated in the DCI scheduling the associated PDSCH. PUCCH carrying CSI may be associated with a low priority. Periodic SRS and semi-persistent SRS may be associated with a low priority. Aperiodic SRS may have a low priority, high priority, or no priority. Aperiodic CSI may receive a priority based on the uplink grant (e.g., a bit in the uplink grant indicates the priority of the aperiodic CSI). In a configured grant PUSCH, the grant may include a bit that indicates a low or high priority.

In some cases, the scheduling restriction may be dependent on whether the second transmission is an uplink transmission scheduled on a flexible symbol then later canceled due to the cancellation indication 210. For example, the initial scheduling indication 205 (e.g., scheduling grant or SFI) schedules a flexible symbol that schedules a flexible symbol for an uplink transmission. In such cases, the UE 115-*b* is not expected to receive a downlink grant (e.g., scheduling indication 215) scheduling a PDSCH on the unused symbols 240. That is, the UE 115-*b* may not expect to receive a grant (e.g., slot format indication (SFI) or scheduling grant) that switches the direction of an allocated flexible symbols (downlink to uplink or uplink to downlink). In some implementations, symbols that are not flexible (semi-statically allocated uplink or downlink symbols) may not be changed. Further, whether the scheduling restriction applies may depend on the capability of the UE 115-*b*. Since rescheduling unused symbols 240 may increase complexity or processing at the UE 115-*b*. The UE 115-*b* and/or the base station 105-*b* may consider the capability of the UE 115-*b* in determining whether to apply the scheduling restriction.

Figure 3:
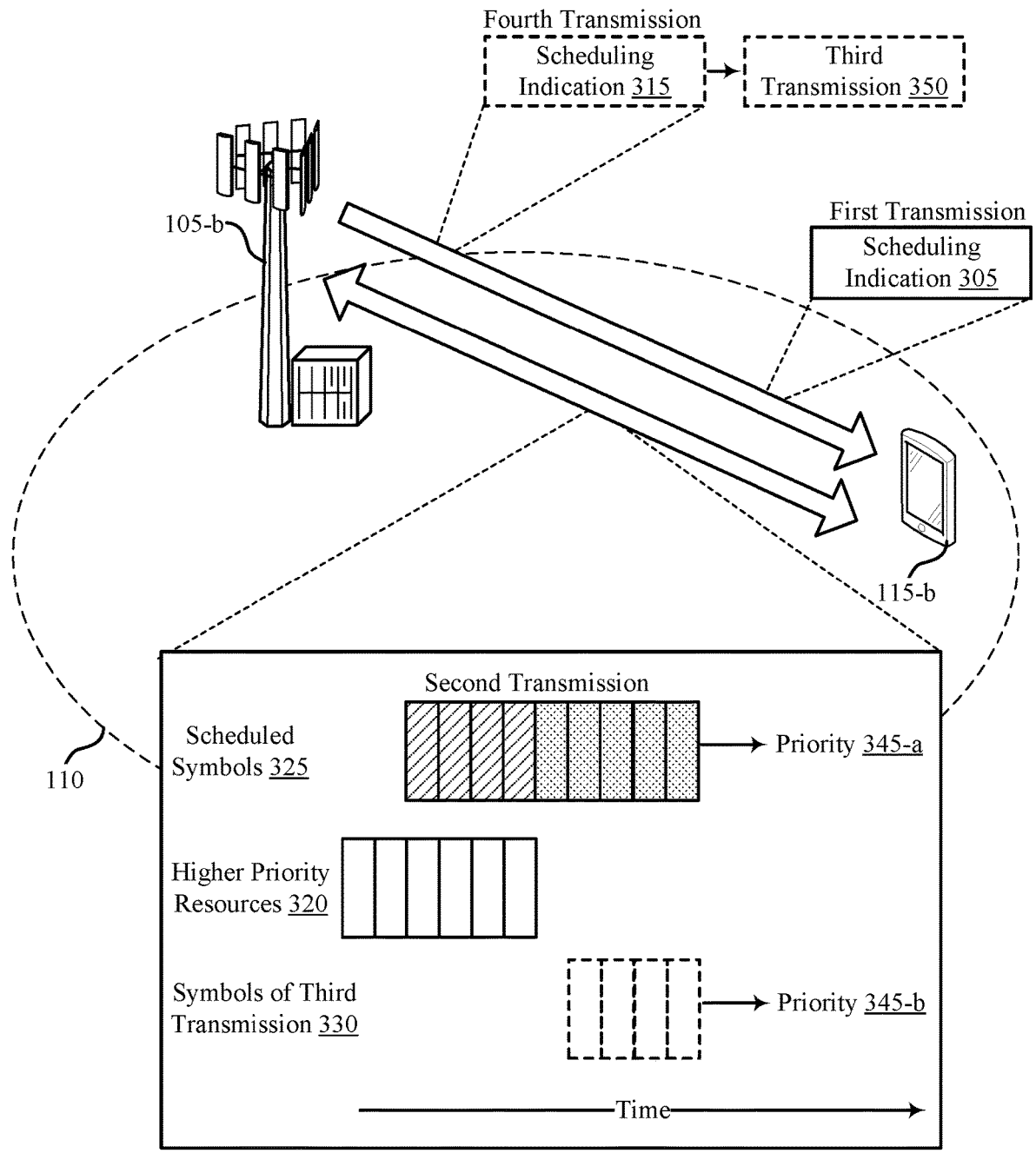
FIG. 3 illustrates an example of a wireless communications system that supports scheduling restrictions for canceled or conflicting resources in accordance with aspects of the present disclosure.

FIG. 3 illustrates an example of a wireless communications system 300 that supports scheduling restrictions for canceled or conflicting resources in accordance with aspects of the present disclosure. In some examples, wireless communications system 300 may implement aspects of wireless communications system 100. The wireless communications system 300 includes a base station 105-*b* and a UE 115-*b*, which may be examples of the corresponding devices of FIGS. 1 and 3. The base station 105-*b* may communicate with UEs 115 in a geographic coverage area 110 of the base station 105-*b*, as described with respect to FIG. 1. The base station 105-*b* may transmit a first transmission including a scheduling indication 305 to schedule a communication channel for the UE 115-*a*. The scheduling indication 305 may be an example a downlink or uplink grant, which may be included in downlink control information, uplink control information, etc. of corresponding channels. The channel may be scheduled in accordance with a semi-static grant or configured grant. The scheduled communication channel may be an example of a PDSCH, PUSCH, PDCCH, or a PUCCH, or one or more SRS and may include scheduled symbols 325 as resources for the channel.

In some cases, the UE 115-*b* may be allocated with another channel having higher priority resources 320. That is, a radio access technology supported by the base station 105-*b* and the UE 115-*b* may support channels having different priorities, such as low priority PUCCH or PUSCH and high priority PUCCH and PUSCH. Accordingly, the second transmission having scheduled symbols 325 may correspond to resources of a low priority PUCCH or PUSCH. The base station 105-*b* may also schedule channel (e.g., PUCCH or PUSCH) having higher priority resources 320. That is, the PUCCH or PUSCH associated with resources 320 may have a higher priority than the channel associated with the scheduled symbols 325.

When resources of a channel having a low priority at least partially overlaps with resources a channel having a high priority, a UE 115-*b* may determine to cancel the low priority channel. The low priority channel may be canceled starting from Tproc,2+d symbols after the ending symbol of a CORESET in which the high priority grant is received. In some examples, the low priority channel may be canceled due to a conflict with a configured resources of a high priority (e.g., SR or PUCCH carrying SPS HARQ-ACK). In such cases, the low priority channel may be canceled starting from the first overlapping symbol. As illustrated in FIG. 3, the higher priority resources 320 overlap with the first four symbols of the scheduled symbols 325, which are indicated as overlapping symbols 335. Accordingly, the UE 115-*b* may determine to drop the second transmission, which includes the remaining unused symbols 340 that are not overlapping. Based on identifying the conflict between the channels (e.g., the overlapping resources), the UE 115-*a* identifies the unused symbols 340.

According to techniques described herein, the UE 115-*b* may assume that the base station 105-*b* will not transmit another scheduling indication 315 scheduling a third transmission 350 on the overlapping symbols 335 and/or the unused symbols 340 (collectively unused symbols). That is, the UE 115-*b* may determine that the unused one or more symbols will not be scheduled by the base station 105-*b* as resources in a third transmission 350 based at least in part on determining that the symbols are unused (e.g., unused symbols 340). Accordingly, the base station may not transmit the scheduling indication 315 (fourth transmission) scheduling the third transmission 350.

However, as described with respect to FIG. 2, the base station 105-*b* may not schedule a third transmission with a lower priority than (or the same priority as) the second transmission that has the unused symbols 240 due to the overlapping resources, and the UE 115-*c* may assume that the base station 105-*c* will not schedule such a transmission. In some cases, the base station 105-*a* transmit a scheduling indication 315 to schedule the third transmission associated with symbols 330 that may include one or more of the unused symbols 340 (or overlapping symbols 335). In some examples, the UE 115-*a* assumes that the scheduled transmission (e.g., third transmission) has a higher priority (e.g., priority 345-*a*) than the second transmission (associated with priority 345-*b*). In some cases, to determine whether to communicate using the resources indicated by the scheduling indication 315 UE 115-*b* may consider priorities 345 associated with the scheduled transmission and the priorities associated with the third transmission being scheduled by the new scheduling indication 315. For example, the second transmission may correspond to a low priority PUSCH, and the third transmission may be a higher priority PUSCH. Based on the third transmission having a higher priority, the UE 115-*b* may determine to communicate using the resources of the third transmission (e.g., the symbols 330). However, if the priority 345-*b* is lower than the priority 345-*a*, then the UE 115-*b* may determine to not communicate using the resources of the third transmission.

Further, as described with respect to FIG. 2, the scheduling restriction may be dependent on whether the second transmission is an uplink transmission scheduled on a flexible symbol then later dropped due to the identified conflict between channels. For example, the initial scheduling indication 305 (e.g., scheduling grant or SFI) schedules a flexible symbol (that schedules a flexible symbol for an uplink transmission). In such cases, the UE 115-*b* is not expected to receive a downlink grant (e.g., scheduling indication 315) scheduling a PDSCH on the unused symbols 340. That is, the UE 115-*b* may not expect to receive a grant (e.g., SFI or scheduling grant) that switches the direction of an allocated flexible symbols (downlink to uplink or uplink to downlink). In some implementations, symbols that are not flexible (semi-statically allocated uplink or downlink symbols) may not be changed. Further, whether the scheduling restriction applies may depend on the capability of the UE 115-*b*. Since rescheduling unused symbols 340 may increase complexity or processing at the UE 115-*b*. The UE 115-*b* and/or the base station 105-*b* may consider the capability of the UE 115-*b* in determining whether to apply the scheduling restriction.

Figure 4:
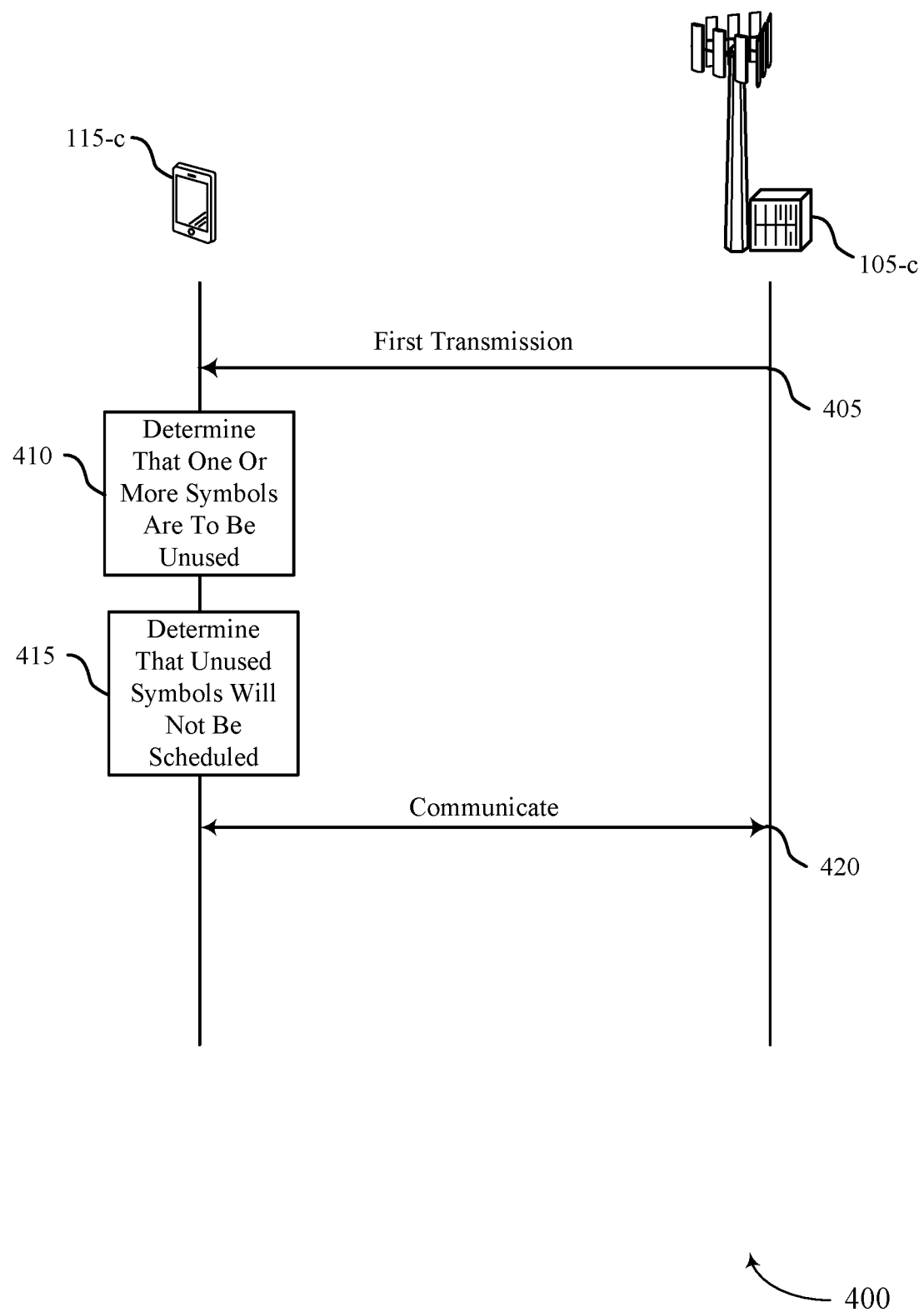
FIG. 4 illustrates an example of a process flow diagram that supports scheduling restrictions for canceled or conflicting resources in accordance with aspects of the present disclosure.

FIG. 4 illustrates an example of a process flow diagram 400 that supports scheduling restrictions for canceled or conflicting resources in accordance with aspects of the present disclosure. In some examples, process flow diagram 400 may implement aspects of wireless communications system 100. The process flow diagram 400 includes a base station 105-*c* and a UE 115-*c*, which may be examples of the corresponding devices of FIGS. 1 through 3.

At 405, the base station 105-*c* transmits a first transmission scheduling resources for a second transmission. At 410, the UE 115-*c* determines that one or more symbols of the scheduled resources are to be unused for the second transmission based at least in part on a cancellation indication received from the base station. For example, the second transmission may be an uplink channel such as a PUSCH or PUCCH, and the UE 115-*c* may receive a cancellation indication that indicates at least a portion of the uplink channel is canceled. The cancellation indication may be transmitted by the base station 105-*c* for prioritizing the resources for utilization by another UE for higher priority communications. In response to the cancellation indication, the UE 115-*c* may identify that some of the resources (e.g., the one or more symbols) are to be unused (e.g., the remaining symbols positioned in a slot after the canceled symbols). In another example, the UE 115-*c* may be scheduled with two different uplink channels that have overlapping resources. For example, the UE 115-*c* may be scheduled with a low priority PUSCH and a high priority PUSCH that has overlapping resources with the low priority PUSCH. In such cases, the UE 115 may determine to not transmit the lower priority PUSCH, and thus the resources (e.g., one or more symbols) in the PUSCH that were not overlapping may be determined to be unused by the UE 115-*c*. In some cases, the UE 115-*c* determines that the one or more symbols of the scheduled resources are to be unused for the second transmission based on a conflict between the scheduled resources for the second transmission and higher priority resources scheduled by the base station 105-*c*. Thus, the second transmission may have a first priority that is indicated by the base station 105-*c* and is used to determine the conflicts.

At 415, the UE 115-*c*, may determine that the unused one or more symbols will not be scheduled by the base station as resources in a third transmission based at least in part on determining that the one or more symbols are to be unused. That is, the UE 115-*c* may determine that the unused symbols will not be rescheduled with for transmission having the same priority or a lower priority of the originally scheduled transmission. However, the base station may transmit an indication to schedule the unused resources for another channel having a different/higher priority. When the priorities are different, then the UE 115 may determine to either communicate or not communicate using the one or more symbols based at least in part on the relative priorities. More particularly, if the priority of the transmission being scheduled is greater than the priority of the channel having the resources that were canceled/overlapping with a higher priority channel, then the UE 115-c may determine to communicate using the one or more symbols as well as the resources indicated by the base station 105-c. In some cases, the determination is based on the priority of the third transmission (e.g., a first priority of the third transmission).

At 420, the UE 115-c communicates with the base station 105-c based at least in part on determining that the unused one or more symbols will not be scheduled by the base station as resources in the third transmission. The communication may include communicating with the base station using other resources. In some examples, the communication may include communicating using the one or more unused symbols based on determining that a scheduled transmission using the unused symbols has a higher priority than the channel that included the overlapping or canceled resources.

Figure 5:
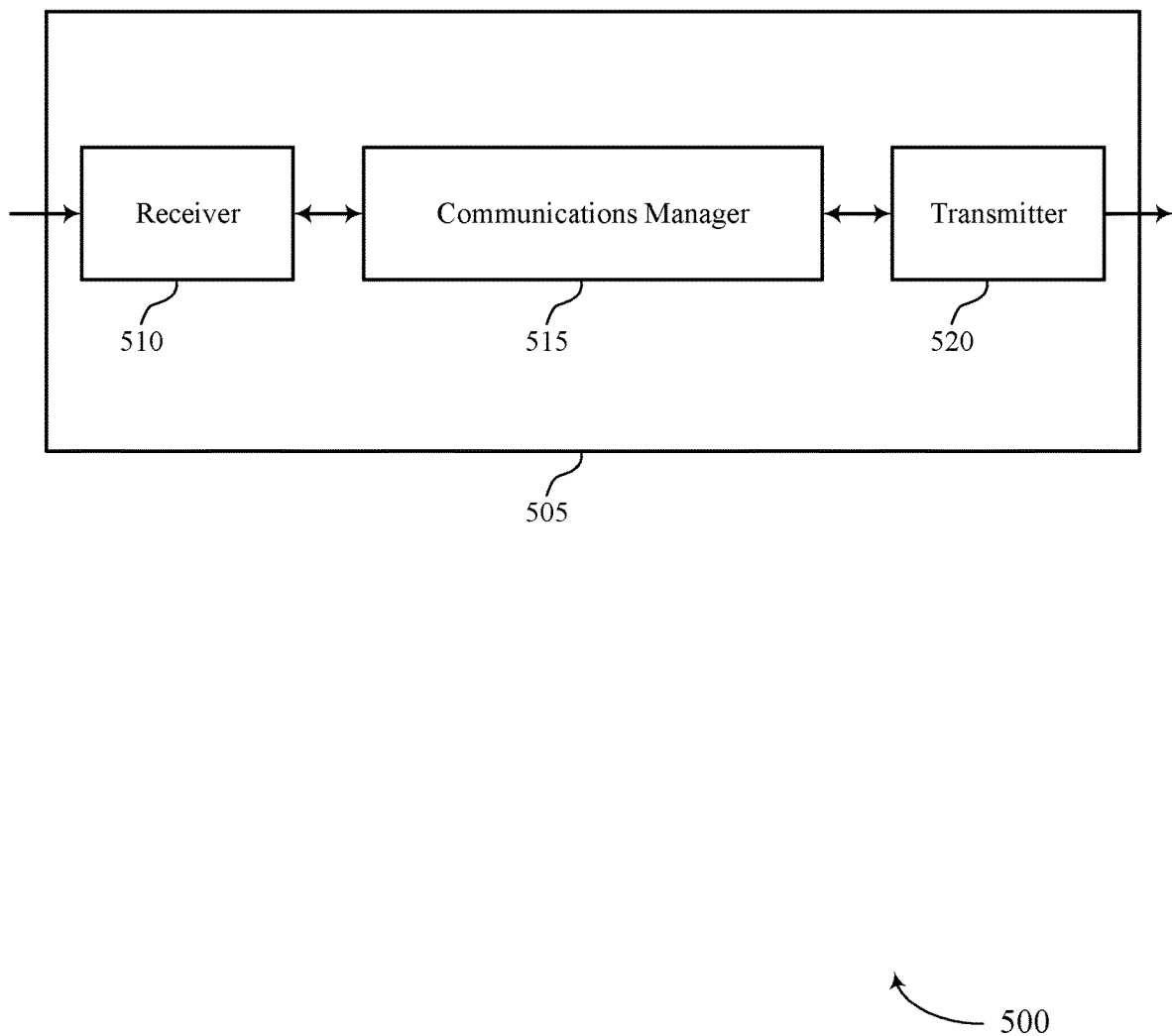
FIGS. 5 and 6 show block diagrams of devices that support scheduling restrictions for canceled or conflicting resources in accordance with aspects of the present disclosure.

FIG. 5 shows a block diagram 500 of a device 505 that supports scheduling restrictions for canceled or conflicting resources in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to scheduling restrictions for canceled or conflicting resources, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a first transmission scheduling resources for a second transmission. The communications manager 515 may determine that one or more symbols of the scheduled resources are to be unused for the second transmission based on a cancellation indication received from the base station. The communications manager 515 may determine that the unused one or more symbols will not be scheduled by the base station as resources in a third transmission based on determining that the one or more symbols are to be unused. The communications manager 515 may communicate with the base station based on determining that the unused one or more symbols will not be scheduled by the base station as resources in the third transmission. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently coordinate communication between a set of TRPs and the device 505, and more specifically to determine scheduling restrictions for canceled, unused, or conflicting symbols. For example, the device 505 may determine that one or more symbols are to be unused based at least in part on receiving a cancellation indication or identifying a higher priority channel that overlaps with the scheduled transmission. The device 505 may determine that the unused symbols are not to be rescheduled by the base station or that the unused channels may be used in a transmission having a higher priority than the previously scheduled transmission that was at least partially canceled or had overlapping resources.

Based on implementing the scheduling techniques as described herein, a processor of a UE 115 (e.g., controlling the receiver 510, the transmitter 520, or the transceiver 820 as described with reference to FIG. 8) may increase reliability and decrease signaling overhead since the symbols may be unused, thus reducing processing complexity of rescheduling canceled or unused symbols.

Figure 6:
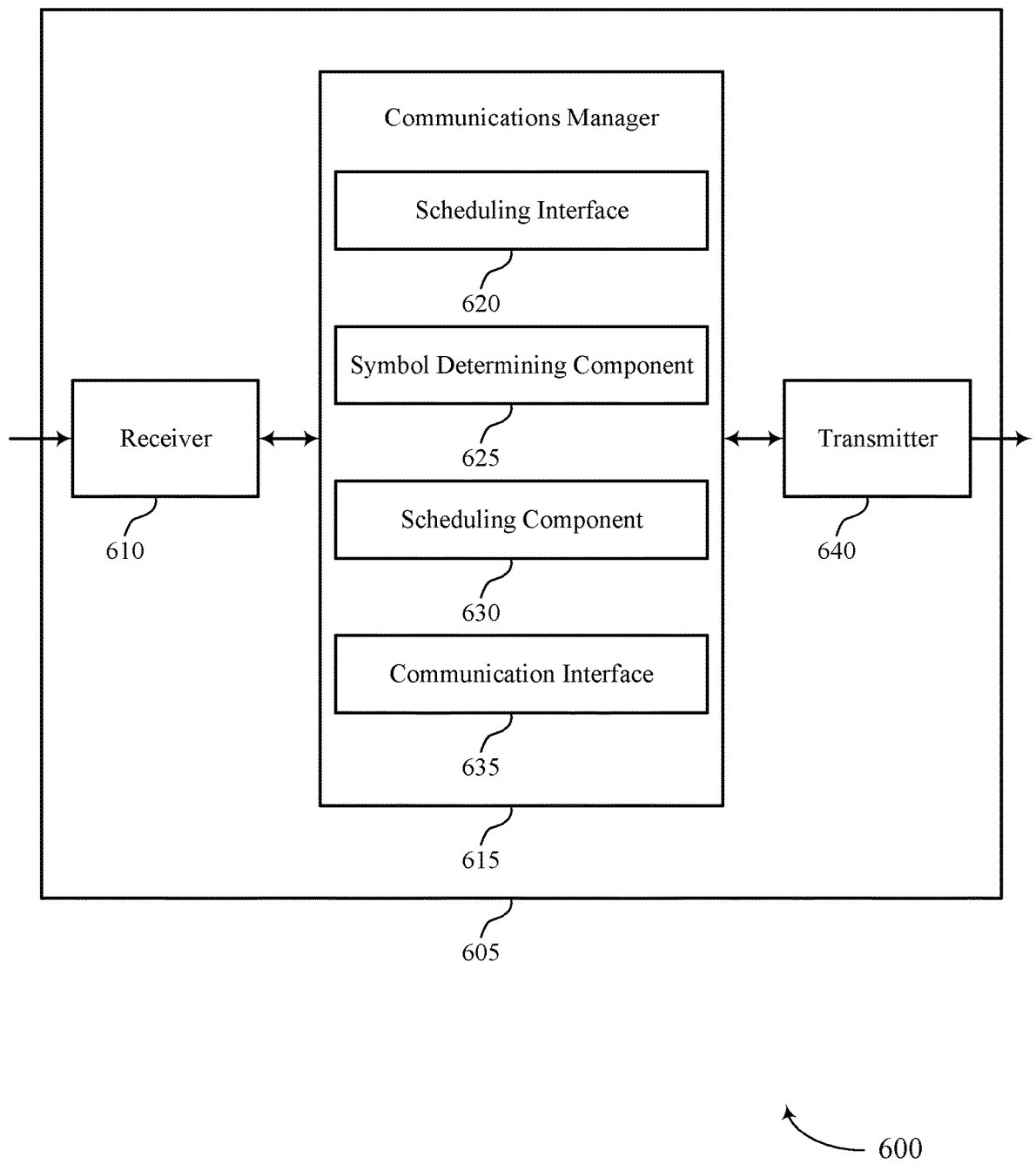

FIG. 6 shows a block diagram 600 of a device 605 that supports scheduling restrictions for canceled or conflicting resources in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to scheduling restrictions for canceled or conflicting resources, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a scheduling interface 620, a symbol determining component 625, a scheduling component 630, and a communication interface 635. The communications manager 615 may be an example of aspects of the communications manager 810 described herein.

The scheduling interface 620 may receive, from a base station, a first transmission scheduling resources for a second transmission.

The symbol determining component 625 may determine that one or more symbols of the scheduled resources are to be unused for the second transmission based on a cancellation indication received from the base station.

The scheduling component 630 may determine that the unused one or more symbols will not be scheduled by the base station as resources in a third transmission based on determining that the one or more symbols are to be unused.

The communication interface 635 may communicate with the base station based on determining that the unused one or more symbols will not be scheduled by the base station as resources in the third transmission.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
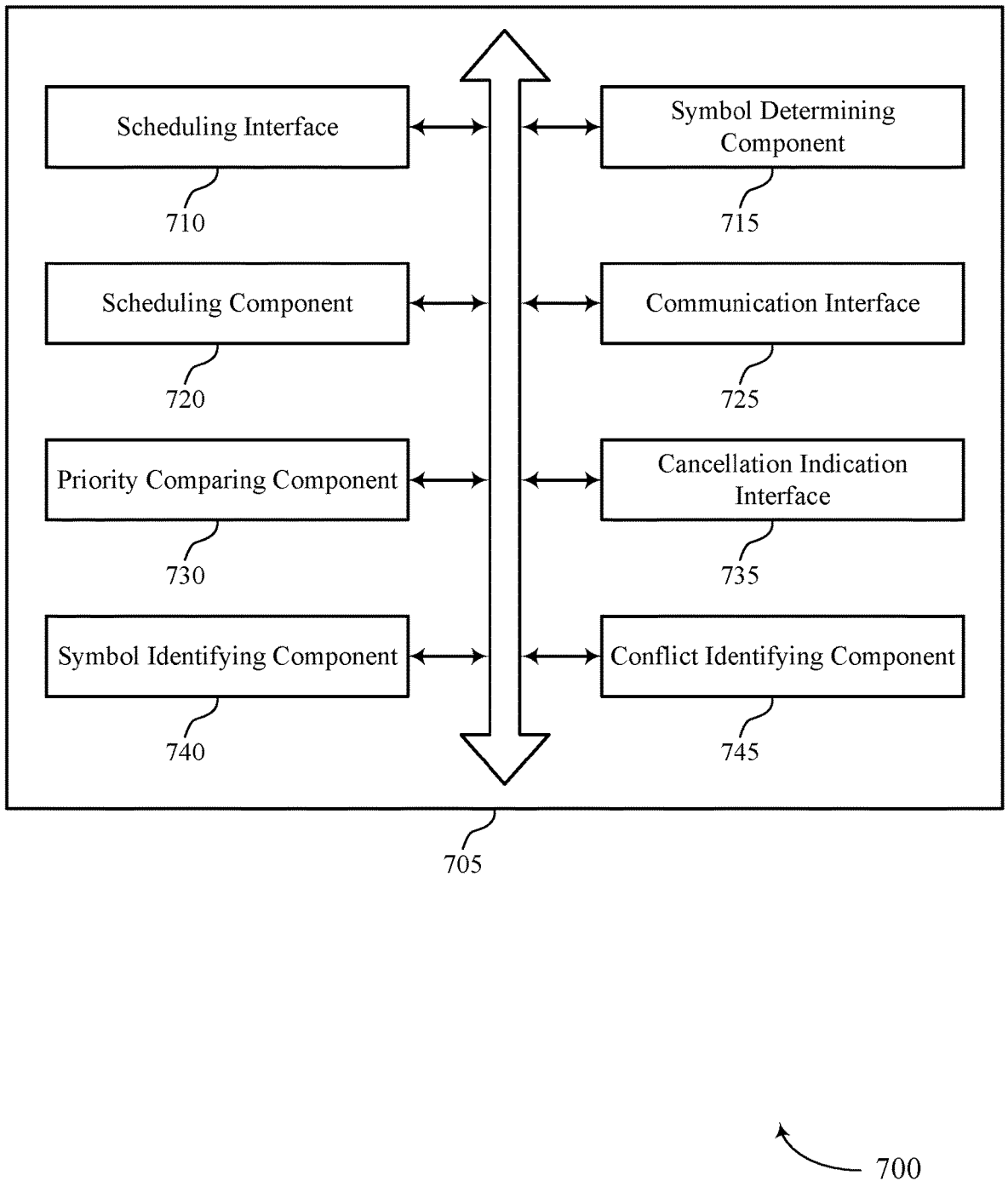
FIG. 7 shows a block diagram of a communications manager that supports scheduling restrictions for canceled or conflicting resources in accordance with aspects of the present disclosure.

FIG. 7 shows a block diagram 700 of a communications manager 705 that supports scheduling restrictions for canceled or conflicting resources in accordance with aspects of the present disclosure. The communications manager 705 may be an example of aspects of a communications manager 515, a communications manager 615, or a communications manager 810 described herein. The communications manager 705 may include a scheduling interface 710, a symbol determining component 715, a scheduling component 720, a communication interface 725, a priority comparing component 730, a cancellation indication interface 735, a symbol identifying component 740, and a conflict identifying component 745. Each of these modules may communicate, directly or indirectly, with one another (e.g., via one or more buses).

The scheduling interface 710 may receive, from a base station, a first transmission scheduling resources for a second transmission.

In some examples, the scheduling interface 710 may receive, from the base station, a fourth transmission scheduling at least one symbol of the one or more symbols as resources for the third transmission associated with a second priority different than the first priority, where communicating with the base station is based on receiving the fourth transmission.

In some cases, the fourth transmission includes a downlink grant scheduling the resources for a physical downlink shared channel and the second priority corresponds to a physical uplink control channel allocated for transmitting feedback associated with the physical downlink shared channel.

In some cases, the fourth transmission includes an uplink grant scheduling the resources for a physical uplink shared channel and the second priority is associated with the physical uplink shared channel.

The symbol determining component 715 may determine that one or more symbols of the scheduled resources are to be unused for the second transmission based on a cancellation indication received from the base station.

In some examples, the symbol determining component 715 may determine that the second transmission is an uplink transmission and the one or more symbols include flexible symbols scheduled as uplink symbols for the uplink transmission, where the UE determines that the unused one or more symbols will not be scheduled based on determining that the second transmission is the uplink transmission and the one or more symbols include flexible symbols.

The scheduling component 720 may determine that the unused one or more symbols will not be scheduled by the base station as resources in a third transmission based on determining that the one or more symbols are to be unused.

In some examples, the scheduling component 720 may determine that the unused one or more symbols will not be scheduled by the base station based on a capability of the UE. In some cases, the third transmission includes a physical uplink shared channel, a physical uplink control channel, or one or more sounding reference signals.

The communication interface 725 may communicate with the base station based on determining that the unused one or more symbols will not be scheduled by the base station as resources in the third transmission.

The priority comparing component 730 may determine to not communicate using the scheduled resources of the third transmission based on the second priority being lower than the first priority, where communicating with the base station is based on determining to not communicate using the scheduled resources of the third transmission.

In some examples, the priority comparing component 730 may determine to communicate using the scheduled resources of the third transmission based on the second priority being higher than the first priority, where communicating with the base station is based on determining to communicate using the scheduled resources of the third transmission.

The cancellation indication interface 735 may receive, from the base station, the cancellation indication canceling at least one symbol of a slot including the one or more symbols of the second transmission, where determining that the one or more symbols of the scheduled resources are to be unused for the second transmission is based on receiving the cancellation indication.

In some cases, the second transmission is an uplink transmission and the cancellation indication is an uplink cancellation indication. In some cases, the second transmission is a downlink transmission and the cancellation indication is a downlink cancellation indication.

The symbol identifying component 740 may determine the one or more symbols positioned in the second transmission after the at least one symbol of the slot, where determining that the one or more symbols of the scheduled resources are to be unused for the second transmission is based on determining the one or more symbols positioned in the second transmission after the at least one symbol in the cancellation indication.

In some examples, the symbol identifying component 740 may determine the one or more symbols of the second transmission positioned in the second transmission after at least one symbol of the second transmission that is overlapping with the resources of the higher priority resources, where determining that the one or more symbols of the scheduled resources are to be unused for the second transmission is based on determining the one or more symbols of the second transmission.

The conflict identifying component 745 may determine that at least a portion of the resources of the second transmission and the higher priority resources scheduled by the base station are overlapping, where determining that the one or more symbols of the scheduled resources are to be unused for the second transmission is based on determining that the at least the portion of the resources of the second transmission and the higher priority resources scheduled by the base station are overlapping. In some cases, the second transmission corresponds to a physical uplink control channel or a physical uplink shared channel.

In some cases, the higher priority resources correspond to resources of a higher priority physical uplink control channel compared to the physical uplink control channel or a higher priority physical uplink shared channel compared to the physical uplink shared channel.

Figure 8:
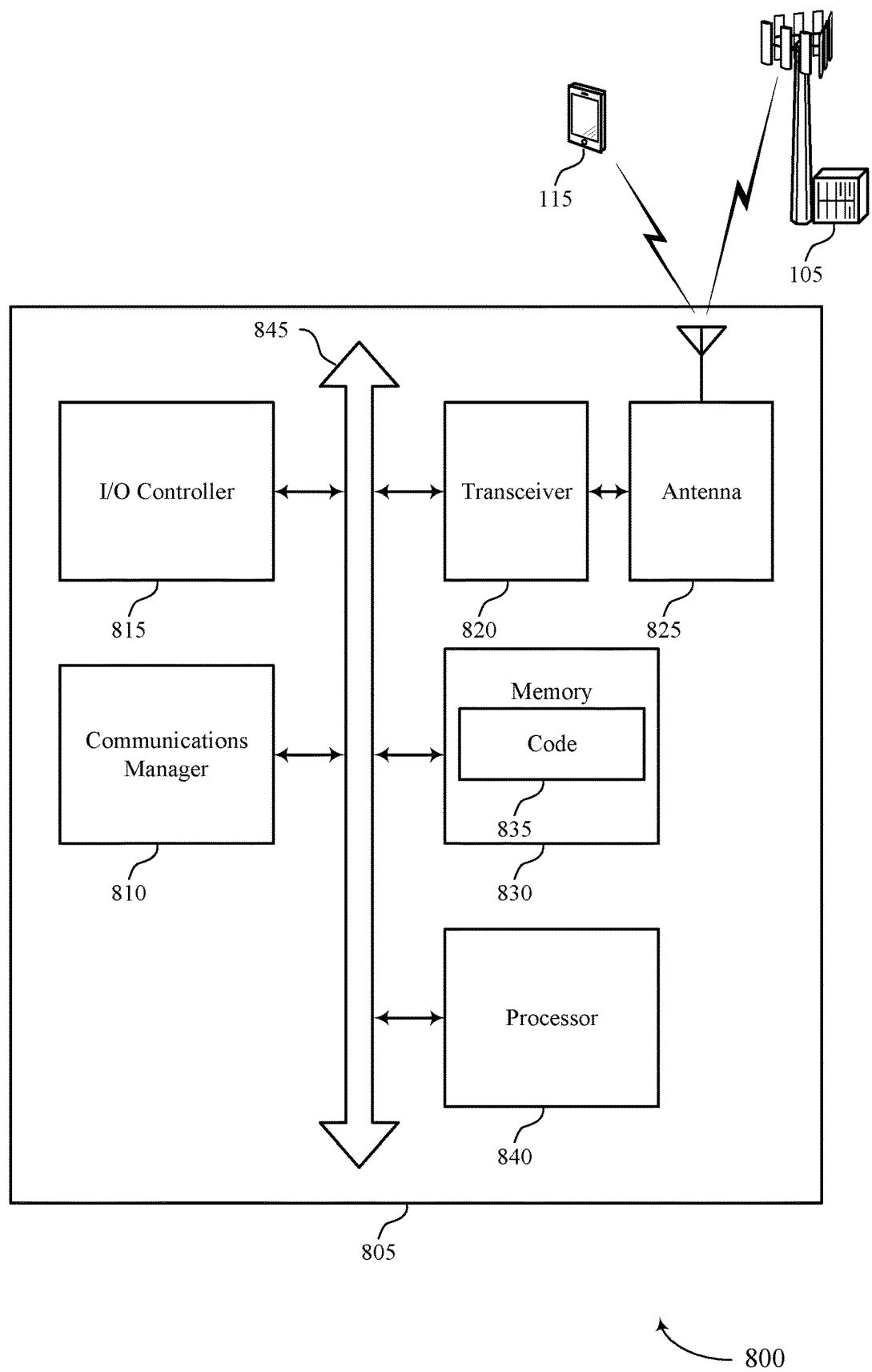
FIG. 8 shows a diagram of a system including a device that supports scheduling restrictions for canceled or conflicting resources in accordance with aspects of the present disclosure.

FIG. 8 shows a diagram of a system 800 including a device 805 that supports scheduling restrictions for canceled or conflicting resources in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a first transmission scheduling resources for a second transmission. The communications manager 810 may determine that one or more symbols of the scheduled resources are to be unused for the second transmission based on a cancellation indication received from the base station. The communications manager 810 may determine that the unused one or more symbols will not be scheduled by the base station as resources in a third transmission based on determining that the one or more symbols are to be unused. The communications manager 810 may communicate with the base station based on determining that the unused one or more symbols will not be scheduled by the base station as resources in the third transmission.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting scheduling restrictions for canceled or conflicting resources).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
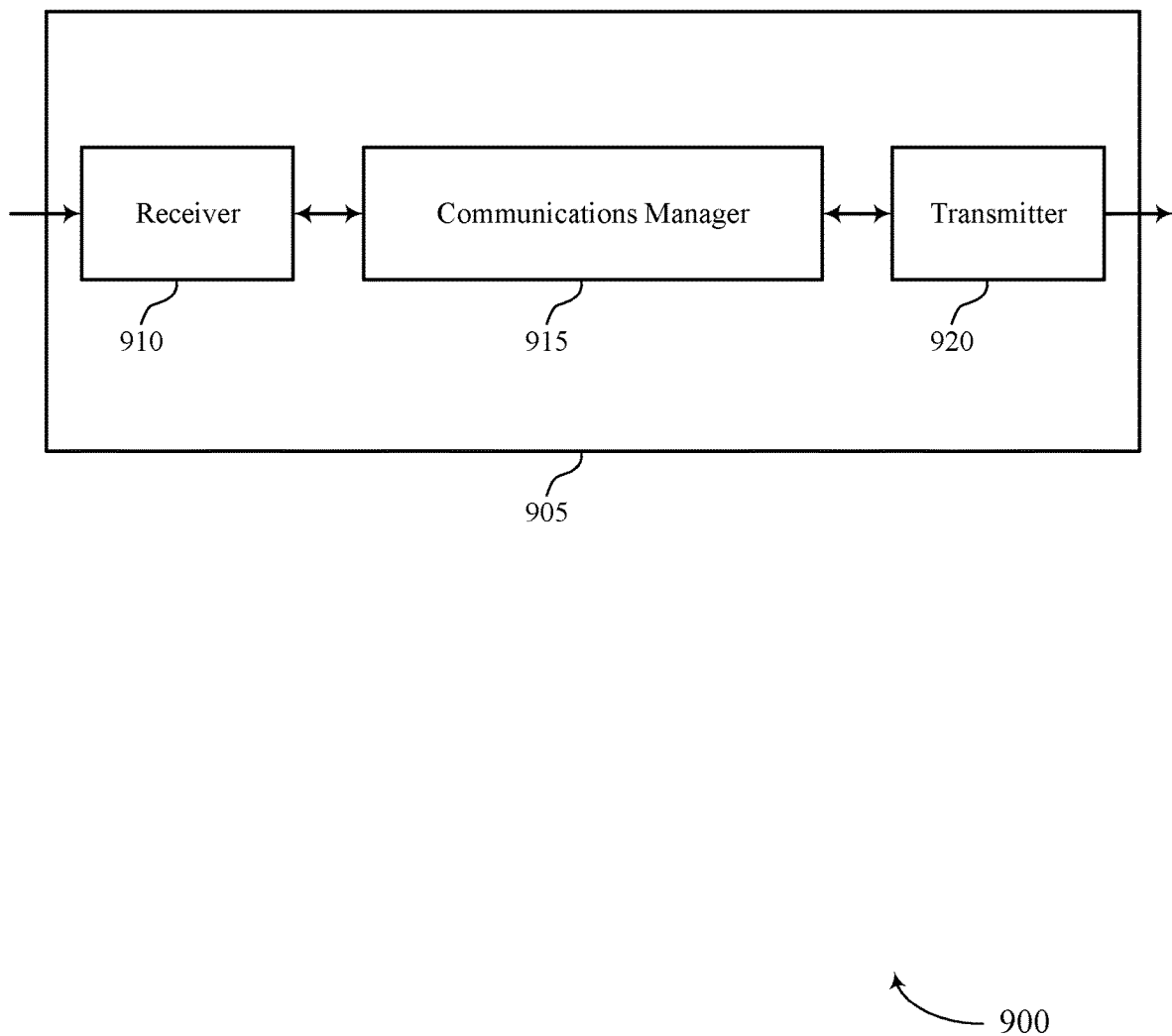
FIGS. 9 and 10 show block diagrams of devices that support scheduling restrictions for canceled or conflicting resources in accordance with aspects of the present disclosure.

FIG. 9 shows a block diagram 900 of a device 905 that supports scheduling restrictions for canceled or conflicting resources in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to scheduling restrictions for canceled or conflicting resources, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a first transmission scheduling resources for a second transmission. The communications manager 915 may determine that one or more symbols of the scheduled resources are to be unused for the second transmission based on a cancellation indication transmitted by the base station. The communications manager 915 may determine that the unused one or more symbols will not be scheduled in a third transmission associated with the first priority based on determining that the one or more symbols are to be unused. The communications manager 915 may communicate with the UE based on determining that the unused one or more symbols will not be scheduled as resources in the third transmission. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
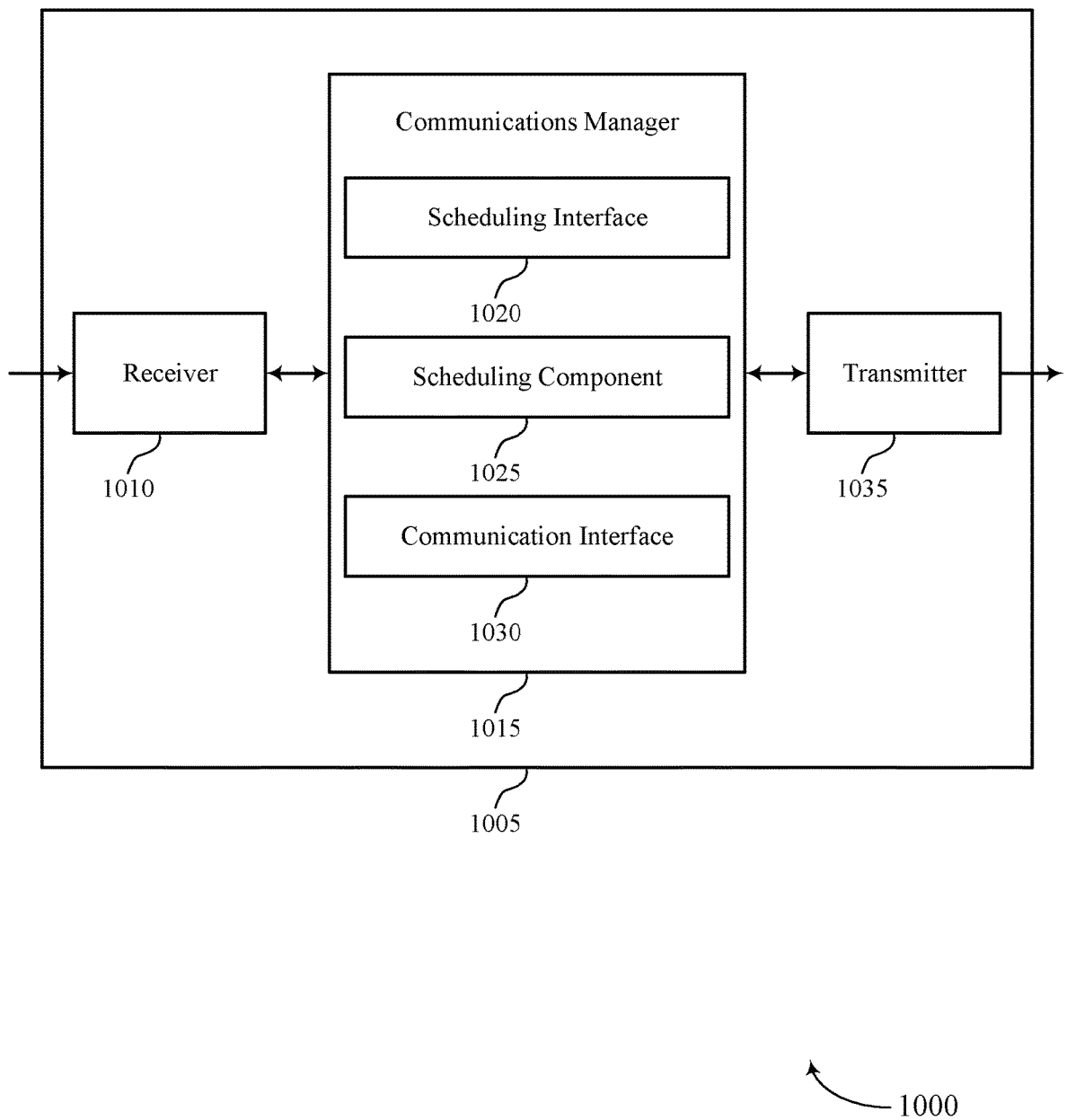

FIG. 10 shows a block diagram 1000 of a device 1005 that supports scheduling restrictions for canceled or conflicting resources in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to scheduling restrictions for canceled or conflicting resources, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a scheduling interface 1020, a scheduling component 1025, and a communication interface 1030. The communications manager 1015 may be an example of aspects of the communications manager 1210 described herein.

The scheduling interface 1020 may transmit, to a UE, a first transmission scheduling resources for a second transmission.

The scheduling component 1025 may determine that one or more symbols of the scheduled resources are to be unused for the second transmission based on a cancellation indication transmitted by the base station and determine that the unused one or more symbols will not be scheduled in a third transmission associated with the first priority based on determining that the one or more symbols are to be unused.

The communication interface 1030 may communicate with the UE based on determining that the unused one or more symbols will not be scheduled as resources in the third transmission.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
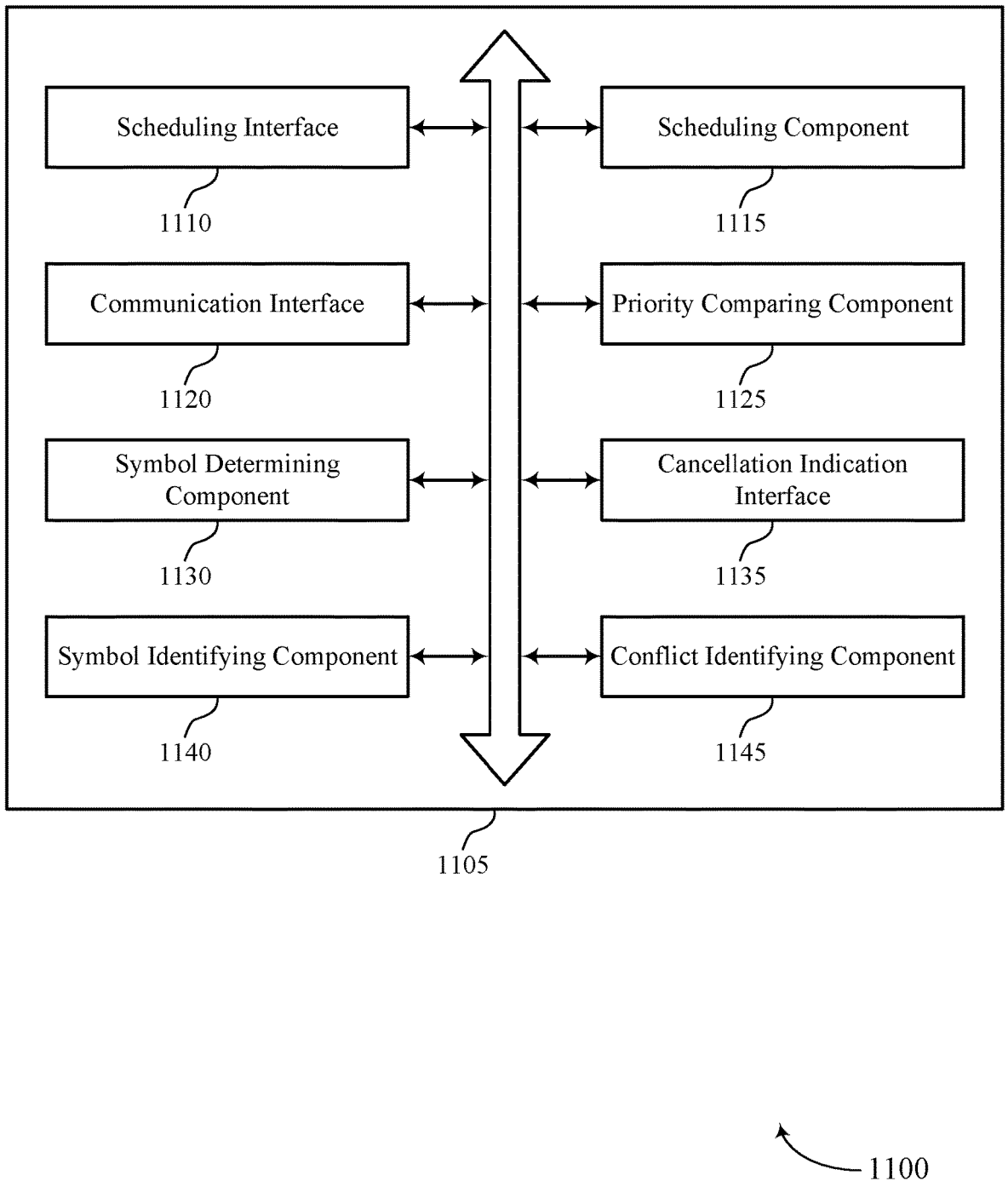
FIG. 11 shows a block diagram of a communications manager that supports scheduling restrictions for canceled or conflicting resources in accordance with aspects of the present disclosure.

FIG. 11 shows a block diagram 1100 of a communications manager 1105 that supports scheduling restrictions for canceled or conflicting resources in accordance with aspects of the present disclosure. The communications manager 1105 may be an example of aspects of a communications manager 915, a communications manager 1015, or a communications manager 1210 described herein. The communications manager 1105 may include a scheduling interface 1110, a scheduling component 1115, a communication interface 1120, a priority comparing component 1125, a symbol determining component 1130, a cancellation indication interface 1135, a symbol identifying component 1140, and a conflict identifying component 1145. Each of these modules may communicate, directly or indirectly, with one another (e.g., via one or more buses).

The scheduling interface 1110 may transmit, to a UE, a first transmission scheduling resources for a second transmission.

In some examples, the scheduling interface 1110 may transmit, to the UE, a fourth transmission scheduling at least one symbol of the one or more symbols as resources for the third transmission associated with a second priority different than the first priority, where communicating with the base station is based on receiving the fourth transmission.

In some cases, the fourth transmission includes a downlink grant scheduling the resources for a physical downlink shared channel and the second priority corresponds to a physical uplink control channel allocated for transmitting feedback associated with the physical downlink shared channel.

In some cases, the fourth transmission includes an uplink grant scheduling the resources for a physical uplink shared channel and the second priority is associated with the physical uplink shared channel.

The scheduling component 1115 may determine that one or more symbols of the scheduled resources are to be unused for the second transmission based on a cancellation indication transmitted by the base station.

In some examples, the scheduling component 1115 may determine that the unused one or more symbols will not be scheduled in a third transmission associated with the first priority based on determining that the one or more symbols are to be unused.

In some examples, the scheduling component 1115 may determine that the unused one or more symbols will not be scheduled based on a capability of the UE.

In some cases, the third transmission includes a physical uplink shared channel, a physical uplink control channel, or one or more sounding reference signals.

In some cases, the second transmission is an uplink transmission and the cancellation indication is an uplink cancellation indication.

In some cases, the second transmission is a downlink transmission and the cancellation indication is a downlink cancellation indication.

The communication interface 1120 may communicate with the UE based on determining that the unused one or more symbols will not be scheduled as resources in the third transmission.

The priority comparing component 1125 may determine to not communicate using the scheduled resources of the third transmission based on the second priority being lower than the first priority, where communicating with the base station is based on determining to not communicate using the scheduled resources of the third transmission.

In some examples, the priority comparing component 1125 may determine to communicate using the scheduled resources of the third transmission based on the second priority being higher than the first priority, where communicating with the base station is based on determining to communicate using the scheduled resources of the third transmission.

The symbol determining component 1130 may determine that the second transmission is an uplink transmission and the one or more symbols include flexible symbols scheduled as uplink symbols for the uplink transmission, where the base station determines that the unused one or more symbols will not be scheduled based on determining that the second transmission is the uplink transmission and the one or more symbols include flexible symbols.

The cancellation indication interface 1135 may transmit, to the UE, the cancellation indication canceling at least one symbol of a slot including the one or more symbols of the second transmission where determining that the one or more symbols of the scheduled resources are to be unused for the second transmission is based on receiving the cancellation indication.

The symbol identifying component 1140 may determine the one or more symbols positioned in the second transmission after the at least one symbol of the slot, where determining that the one or more symbols of the scheduled resources are to be unused for the second transmission is based on determining the one or more symbols positioned in the second transmission after the at least one symbol in the cancellation indication.

In some examples, the symbol identifying component 1140 may determine the one or more symbols of the second transmission positioned in the second transmission after at least one symbol of the second transmission that is overlapping with the resources of the higher priority resources, where determining that the one or more symbols of the scheduled resources are to be unused for the second transmission is based on determining the one or more symbols of the second transmission.

The conflict identifying component 1145 may determine that at least a portion of the resources of the second transmission and the higher priority resources scheduled by the base station are overlapping, where determining that the one or more symbols of the scheduled resources are to be unused for the second transmission is based on determining that the at least the portion of the resources of the second transmission and the higher priority resources scheduled by the base station are overlapping.

In some cases, the second transmission corresponds to a physical uplink control channel or a physical uplink shared channel.

In some cases, the higher priority resources correspond to resources of a higher priority physical uplink control channel compared to the physical uplink control channel or a higher priority physical uplink shared channel compared to the physical uplink shared channel.

Figure 12:
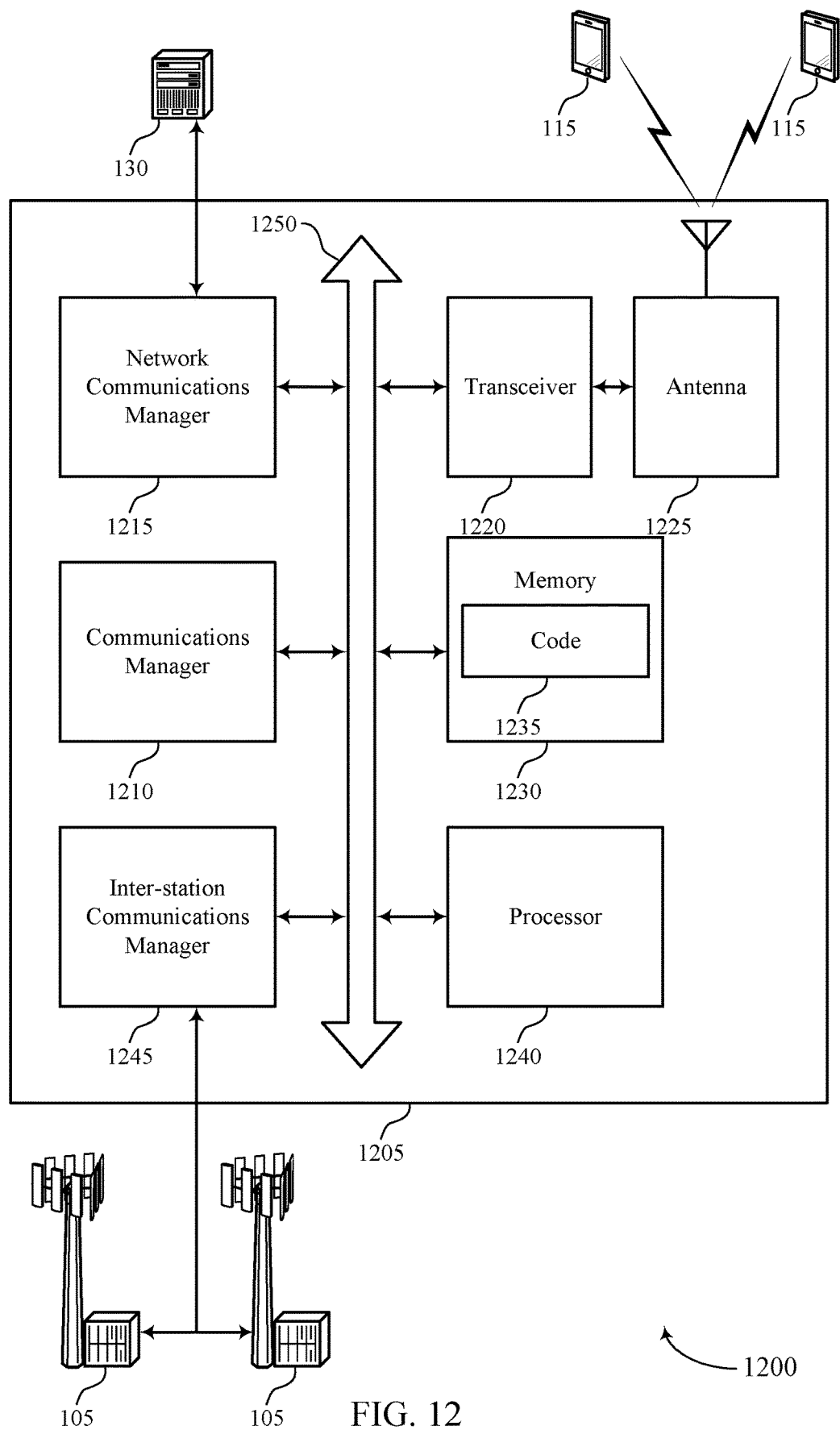
FIG. 12 shows a diagram of a system including a device that supports scheduling restrictions for canceled or conflicting resources in accordance with aspects of the present disclosure.

FIG. 12 shows a diagram of a system 1200 including a device 1205 that supports scheduling restrictions for canceled or conflicting resources in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a first transmission scheduling resources for a second transmission. The communications manager 1210 may determine that one or more symbols of the scheduled resources are to be unused for the second transmission based on a cancellation indication transmitted by the base station. The communications manager 1210 may determine that the unused one or more symbols will not be scheduled in a third transmission associated with the first priority based on determining that the one or more symbols are to be unused. The communications manager 1210 may communicate with the UE based on determining that the unused one or more symbols will not be scheduled as resources in the third transmission.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor

1240. The processor 1240 may be configured to execute computer-readable instructions stored in a memory (e.g., the memory 1230) to cause the device 1205 to perform various functions (e.g., functions or tasks supporting scheduling restrictions for canceled or conflicting resources).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
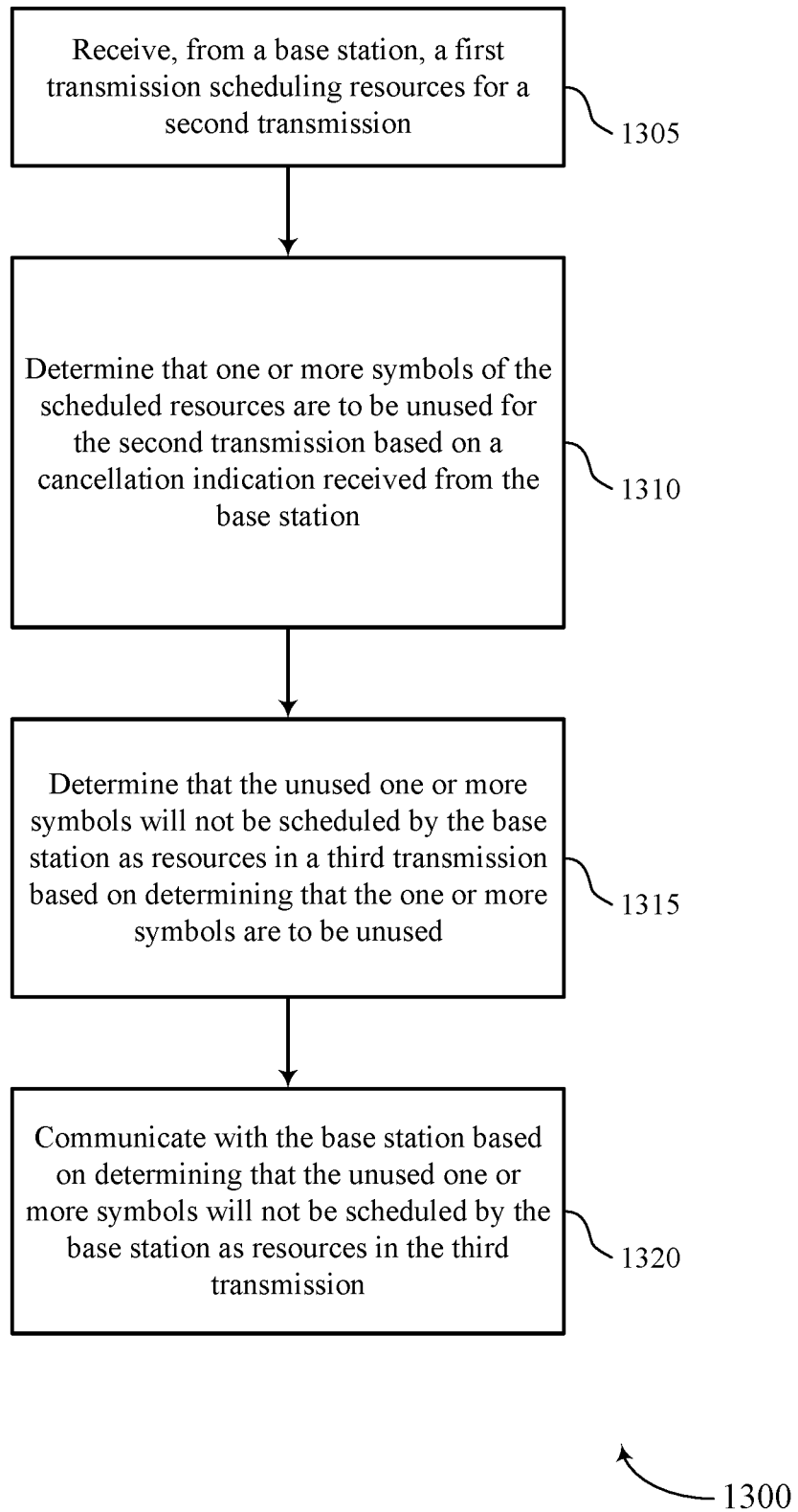
FIGS. 13 and 14 show flowcharts illustrating methods that support scheduling restrictions for canceled or conflicting resources in accordance with aspects of the present disclosure.

FIG. 13 shows a flowchart illustrating a method 1300 that supports scheduling restrictions for canceled or conflicting resources in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a first transmission scheduling resources for a second transmission. The operations of 1305 may be performed according to the methods described herein. In some examples, aspects of the operations of 1305 may be performed by a scheduling interface as described with reference to FIGS. 5 through 8.

At 1310, the UE may determine that one or more symbols of the scheduled resources are to be unused for the second transmission based on a cancellation indication received from the base station. The operations of 1310 may be performed according to the methods described herein. In some examples, aspects of the operations of 1310 may be performed by a symbol determining component as described with reference to FIGS. 5 through 8.

At 1315, the UE may determine that the unused one or more symbols will not be scheduled by the base station as resources in a third transmission based on determining that the one or more symbols are to be unused. The operations of 1315 may be performed according to the methods described herein. In some examples, aspects of the operations of 1315 may be performed by a scheduling component as described with reference to FIGS. 5 through 8.

At 1320, the UE may communicate with the base station based on determining that the unused one or more symbols will not be scheduled by the base station as resources in the third transmission. The operations of 1320 may be performed according to the methods described herein. In some examples, aspects of the operations of 1320 may be performed by a communication interface as described with reference to FIGS. 5 through 8.

Figure 14:
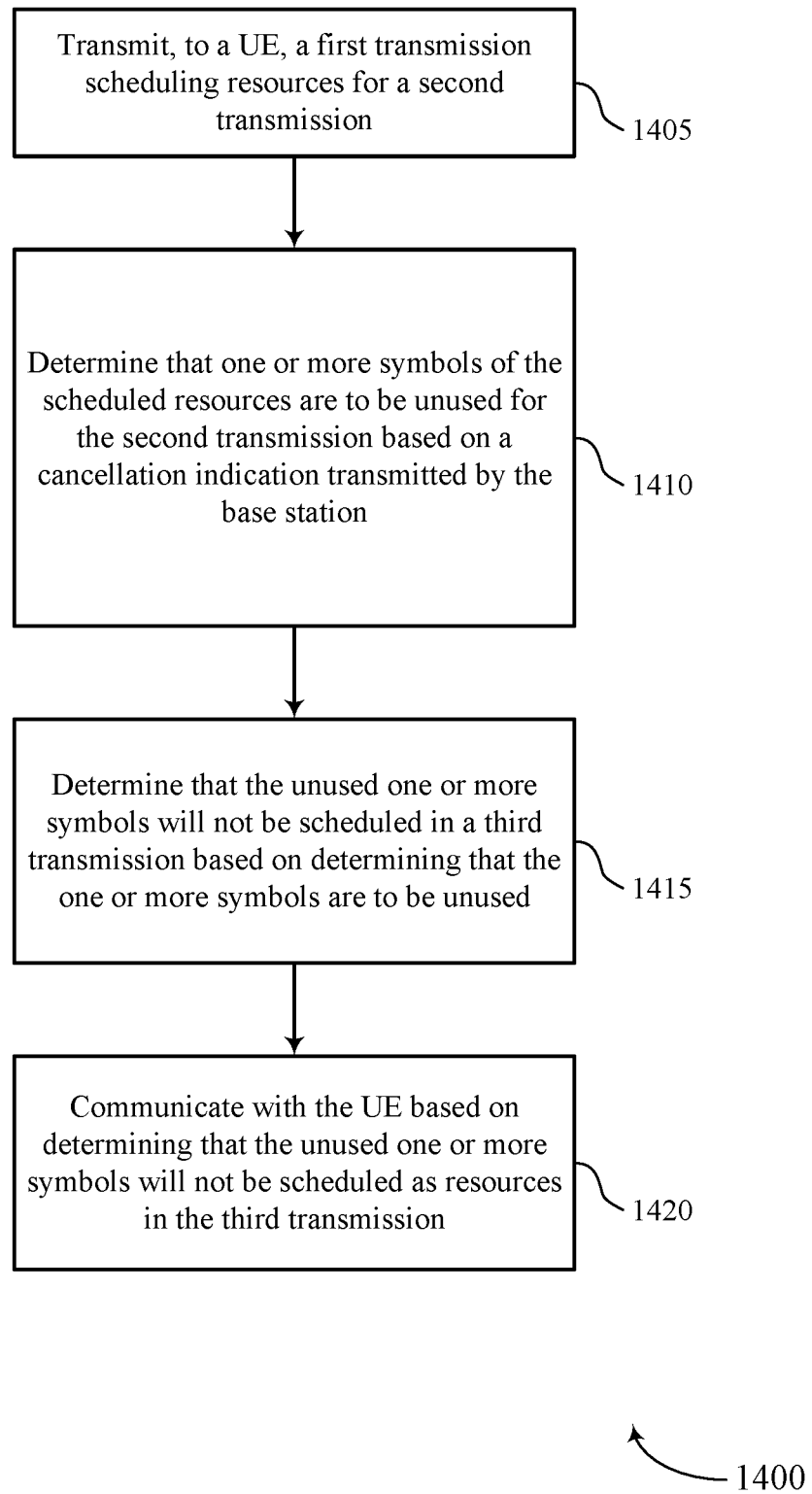

FIG. 14 shows a flowchart illustrating a method 1400 that supports scheduling restrictions for canceled or conflicting resources in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may transmit, to a UE, a first transmission scheduling resources for a second transmission. The operations of 1405 may be performed according to the methods described herein. In some examples, aspects of the operations of 1405 may be performed by a scheduling interface as described with reference to FIGS. 9 through 12.

At 1410, the base station may determine that one or more symbols of the scheduled resources are to be unused for the second transmission based on a cancellation indication transmitted by the base station. The operations of 1410 may be performed according to the methods described herein. In some examples, aspects of the operations of 1410 may be performed by a scheduling component as described with reference to FIGS. 9 through 12.

At 1415, the base station may determine that the unused one or more symbols will not be scheduled in a third transmission associated with the first priority based on determining that the one or more symbols are to be unused. The operations of 1415 may be performed according to the methods described herein. In some examples, aspects of the operations of 1415 may be performed by a scheduling component as described with reference to FIGS. 9 through 12.

At 1420, the base station may communicate with the UE based on determining that the unused one or more symbols will not be scheduled as resources in the third transmission. The operations of 1420 may be performed according to the methods described herein. In some examples, aspects of the operations of 1420 may be performed by a communication interface as described with reference to FIGS. 9 through 12.

The following provides an overview of aspects of the present disclosure:

Aspect 1: A method for wireless communication at a UE, comprising: receiving, from a base station, a first transmission scheduling resources for a second transmission; determining that one or more symbols of the scheduled resources are to be unused for the second transmission based at least in part on a cancellation indication received from the base station; determining that the unused one or more symbols will not be scheduled by the base station as resources in a third transmission based at least in part on determining that the one or more symbols are to be unused; and communicating with the base station based at least in part on determining that the unused one or more symbols will not be scheduled by the base station as resources in the third transmission.

Aspect 2: The method of aspect 1, further comprising: receiving, from the base station, the cancellation indication canceling at least one symbol of a slot comprising the one or more symbols of the second transmission, wherein determining that the one or more symbols of the scheduled resources are to be unused for the second transmission is based at least in part on receiving the cancellation indication.

Aspect 3: The method of aspect 2, further comprising: determining the one or more symbols positioned in the second transmission after the at least one symbol of the slot, wherein determining that the one or more symbols of the scheduled resources are to be unused for the second transmission is based at least in part on determining the one or more symbols positioned in the second transmission after the at least one symbol in the cancellation indication.

Aspect 4: The method of any of aspects 2 through 3, wherein the second transmission is an uplink transmission and the cancellation indication is an uplink cancellation indication.

Aspect 5: The method of any of aspects 2 through 4, wherein the second transmission is a first physical uplink shared channel transmission or a first sounding reference signal transmission and determining that the unused one or more symbols will not be scheduled by the base station comprises determining that the unused one or more symbols will not be scheduled for a second physical uplink shared channel transmission or a second sounding reference signal transmission.

Aspect 6: The method of any of aspects 1 through 5, wherein the second transmission has a first priority, further comprising: receiving, from the base station, a fourth transmission scheduling at least one symbol of the one or more symbols as resources for the third transmission associated with a second priority different than the first priority, wherein communicating with the base station is based at least in part on receiving the fourth transmission.

Aspect 7: The method of aspect 6, further comprising: determining to not communicate using the scheduled resources of the third transmission based at least in part on the second priority being lower than the first priority, wherein communicating with the base station is based at least in part on determining to not communicate using the scheduled resources of the third transmission.

Aspect 8: The method of aspect 6, further comprising: determining to communicate using the scheduled resources of the third transmission based at least in part on the second priority being higher than the first priority, wherein communicating with the base station is based at least in part on determining to communicate using the scheduled resources of the third transmission.

Aspect 9: The method of any of aspects 6 through 8, wherein the fourth transmission comprises a downlink grant scheduling the resources for a physical downlink shared channel and the second priority corresponds to a physical uplink control channel allocated for transmitting feedback associated with the physical downlink shared channel.

Aspect 10: The method of any of aspects 6 through 9, wherein the third transmission comprises a physical uplink shared channel, a physical uplink control channel, or one or more sounding reference signals.

Aspect 11: The method of any of aspects 6 through 10, wherein the fourth transmission comprises an uplink grant scheduling the resources for a physical uplink shared channel and the second priority is associated with the physical uplink shared channel.

Aspect 12: The method of any of aspect 1, further comprising: determining that the second transmission is an uplink transmission and the one or more symbols comprise flexible symbols scheduled as uplink symbols for the uplink transmission, wherein the UE determines that the unused one or more symbols will not be scheduled based at least in part on determining that the second transmission is the uplink transmission and the one or more symbols comprise flexible symbols.

Aspect 13: The method of any of aspects 1 through 12, further comprising: determining that at least a portion of the resources of the second transmission and higher priority resources scheduled by the base station are overlapping, wherein determining that the one or more symbols of the scheduled resources are to be unused for the second transmission is based at least in part on determining that the at least the portion of the resources of the second transmission and the higher priority resources scheduled by the base station are overlapping.

Aspect 14: The method of aspect 13, further comprising: determining the one or more symbols of the second transmission positioned in the second transmission after at least one symbol of the second transmission that is overlapping with the resources of the higher priority resources, wherein determining that the one or more symbols of the scheduled resources are to be unused for the second transmission is based at least in part on determining the one or more symbols of the second transmission.

Aspect 15: The method of any of aspects 13 through 14, wherein the second transmission corresponds to a physical uplink control channel or a physical uplink shared channel; and the higher priority resources correspond to resources of a higher priority physical uplink control channel compared to the physical uplink control channel or a higher priority physical uplink shared channel compared to the physical uplink shared channel.

Aspect 16: The method of any of aspects 1 through 15, wherein determining that the unused one or more symbols will not be scheduled further comprises: determining that the unused one or more symbols will not be scheduled by the base station based at least in part on a capability of the UE.

Aspect 17: A method for wireless communications at a base station, comprising: transmitting, to a UE, a first transmission scheduling resources for a second transmission; determining that one or more symbols of the scheduled resources are to be unused for the second transmission based at least in part on a cancellation indication transmitted by the base station; determining that the unused one or more symbols will not be scheduled in a third transmission based at least in part on determining that the one or more symbols are to be unused; and communicating with the UE based at least in part on determining that the unused one or more symbols will not be scheduled as resources in the third transmission.

Aspect 18: The method of aspect 17, further comprising: transmitting, to the UE, the cancellation indication canceling at least one symbol of a slot comprising the one or more symbols of the second transmission wherein determining that the one or more symbols of the scheduled resources are to be unused for the second transmission is based at least in part on receiving the cancellation indication.

Aspect 19: The method of aspect 18, further comprising: determining the one or more symbols positioned in the second transmission after the at least one symbol of the slot, wherein determining that the one or more symbols of the scheduled resources are to be unused for the second transmission is based at least in part on determining the one or more symbols positioned in the second transmission after the at least one symbol in the cancellation indication.

Aspect 20: The method of any of aspects 18 through 19, wherein the second transmission is an uplink transmission and the cancellation indication is an uplink cancellation indication.

Aspect 21: The method of any of aspects 18 through 20, wherein the second transmission is a first physical uplink shared channel transmission or a first sounding reference signal transmission and determining that the unused one or more symbols will not be scheduled by the base station comprises determining that the unused one or more symbols will not be scheduled for a second physical uplink shared channel transmission or a second sounding reference signal transmission.

Aspect 22: The method of any of aspects 17 through 21, wherein the second transmission has a first priority, further comprising: transmitting, to the UE, a fourth transmission scheduling at least one symbol of the one or more symbols as resources for the third transmission associated with a second priority different than the first priority, wherein communicating with the base station is based at least in part on receiving the fourth transmission.

Aspect 23: The method of aspect 22, further comprising: determining to not communicate using the scheduled resources of the third transmission based at least in part on the second priority being lower than the first priority, wherein communicating with the base station is based at least in part on determining to not communicate using the scheduled resources of the third transmission.

Aspect 24: The method of aspect 22, further comprising: determining to communicate using the scheduled resources of the third transmission based at least in part on the second priority being higher than the first priority, wherein communicating with the base station is based at least in part on determining to communicate using the scheduled resources of the third transmission.

Aspect 25: The method of any of aspects 22 through 24, wherein the fourth transmission comprises a downlink grant scheduling the resources for a physical downlink shared channel and the second priority corresponds to a physical uplink control channel allocated for transmitting feedback associated with the physical downlink shared channel.

Aspect 26: The method of any of aspects 22 through 25, wherein the third transmission comprises a physical uplink shared channel, a physical uplink control channel, or one or more sounding reference signals.

Aspect 27: The method of any of aspects 22 through 26, wherein the fourth transmission comprises an uplink grant scheduling the resources for a physical uplink shared channel and the second priority is associated with the physical uplink shared channel.

Aspect 28: The method of aspects 22, further comprising: determining that the second transmission is an uplink transmission and the one or more symbols comprise flexible symbols scheduled as uplink symbols for the uplink transmission, wherein the base station determines that the unused one or more symbols will not be scheduled based at least in part on determining that the second transmission is the uplink transmission and the one or more symbols comprise flexible symbols.

Aspect 29: The method of any of aspects 17 through 28, further comprising: determining that at least a portion of the resources of the second transmission and the higher priority resources scheduled by the base station are overlapping, wherein determining that the one or more symbols of the scheduled resources are to be unused for the second transmission is based at least in part on determining that the at least the portion of the resources of the second transmission and the higher priority resources scheduled by the base station are overlapping.

Aspect 30: The method of aspect 29, further comprising: determining the one or more symbols of the second transmission positioned in the second transmission after at least one symbol of the second transmission that is overlapping with the resources of the higher priority resources, wherein determining that the one or more symbols of the scheduled resources are to be unused for the second transmission is based at least in part on determining the one or more symbols of the second transmission.

Aspect 31: The method of any of aspects 29 through 30, wherein the second transmission corresponds to a physical uplink control channel or a physical uplink shared channel; and the higher priority resources correspond to resources of a higher priority physical uplink control channel compared to the physical uplink control channel or a higher priority physical uplink shared channel compared to the physical uplink shared channel.

Aspect 32: The method of any of aspects 17 through 31, wherein determining that the unused one or more symbols will not be scheduled further comprises: determining that the unused one or more symbols will not be scheduled based at least in part on a capability of the UE.

Aspect 33: An apparatus for wireless communication at a UE, comprising a processor; memory coupled with the processor; and instructions stored in the memory and executable by the processor to cause the apparatus to perform a method of any of aspects 1 through 16.

Aspect 34: An apparatus for wireless communication at a UE, comprising at least one means for performing a method of any of aspects 1 through 16.

Aspect 35: A non-transitory computer-readable medium storing code for wireless communication at a UE, the code comprising instructions executable by a processor to perform a method of any of aspects 1 through 16.

Aspect 36: An apparatus for wireless communications at a base station, comprising a processor; memory coupled with the processor; and instructions stored in the memory and executable by the processor to cause the apparatus to perform a method of any of aspects 17 through 32.

Aspect 37: An apparatus for wireless communications at a base station, comprising at least one means for performing a method of any of aspects 17 through 32.

Aspect 38: A non-transitory computer-readable medium storing code for wireless communications at a base station, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, a first transmission scheduling resources for a second transmission;
    determining that one or more symbols of the scheduled resources are to be unused for the second transmission based at least in part on a cancellation indication received from the base station;

determining that the unused one or more symbols will not be scheduled by the base station as resources in a third transmission based at least in part on:
a capability of the UE,
determining that the one or more symbols are to be unused, and
determining that the second transmission is an uplink transmission and the unused one or more symbols comprise flexible symbols scheduled as uplink symbols for the uplink transmission; and
communicating with the base station based at least in part on determining that the unused one or more symbols will not be scheduled by the base station as resources in the third transmission.

2. The method of claim 1, further comprising:
receiving, from the base station, the cancellation indication canceling at least one symbol of a slot comprising the one or more symbols of the second transmission, wherein determining that the one or more symbols of the scheduled resources are to be unused for the second transmission is based at least in part on receiving the cancellation indication.

3. The method of claim 2, further comprising:
determining the one or more symbols positioned in the second transmission after the at least one symbol of the slot, wherein determining that the one or more symbols of the scheduled resources are to be unused for the second transmission is based at least in part on determining the one or more symbols positioned in the second transmission after the at least one symbol in the cancellation indication.

4. The method of claim 2, wherein the second transmission is an uplink transmission and the cancellation indication is an uplink cancellation indication.

5. The method of claim 2, wherein the second transmission is a first physical uplink shared channel transmission or a first sounding reference signal transmission and wherein determining that the unused one or more symbols will not be scheduled by the base station comprises determining that the unused one or more symbols will not be scheduled for a second physical uplink shared channel transmission or a second sounding reference signal transmission.

6. The method of claim 1, wherein the second transmission has a first priority, further comprising:
receiving, from the base station, a fourth transmission scheduling at least one symbol of the one or more symbols as resources for the third transmission associated with a second priority different than the first priority, wherein communicating with the base station is based at least in part on receiving the fourth transmission.

7. The method of claim 6, further comprising:
determining to not communicate using the scheduled resources of the third transmission based at least in part on the second priority being lower than the first priority, wherein communicating with the base station is based at least in part on determining to not communicate using the scheduled resources of the third transmission.

8. The method of claim 6, further comprising:
determining to communicate using the scheduled resources of the third transmission based at least in part on the second priority being higher than the first priority, wherein communicating with the base station is based at least in part on determining to communicate using the scheduled resources of the third transmission.

9. The method of claim 6, wherein the fourth transmission comprises a downlink grant scheduling the resources for a physical downlink shared channel and the second priority corresponds to a physical uplink control channel allocated for transmitting feedback associated with the physical downlink shared channel.

10. The method of claim 6, wherein the third transmission comprises a physical uplink shared channel, a physical uplink control channel, or one or more sounding reference signals.

11. The method of claim 6, wherein the fourth transmission comprises an uplink grant scheduling the resources for a physical uplink shared channel and the second priority is associated with the physical uplink shared channel.

12. The method of claim 1, further comprising:
determining that at least a portion of the resources of the second transmission and higher priority resources scheduled by the base station are overlapping, wherein determining that the one or more symbols of the scheduled resources are to be unused for the second transmission is based at least in part on determining that the at least the portion of the resources of the second transmission and the higher priority resources scheduled by the base station are overlapping.

13. The method of claim 12, further comprising:
determining the one or more symbols of the second transmission positioned in the second transmission after at least one symbol of the second transmission that is overlapping with the resources of the higher priority resources, wherein determining that the one or more symbols of the scheduled resources are to be unused for the second transmission is based at least in part on determining the one or more symbols of the second transmission.

14. The method of claim 12, wherein:
the second transmission corresponds to a physical uplink control channel or a physical uplink shared channel; and
the higher priority resources correspond to resources of a higher priority physical uplink control channel compared to the physical uplink control channel or a higher priority physical uplink shared channel compared to the physical uplink shared channel.

15. An apparatus for wireless communication at a user equipment (UE), comprising:
a processor,
memory coupled with the processor; and
instructions stored in the memory and executable by the processor to cause the apparatus to:
receive, from a base station, a first transmission scheduling resources for a second transmission;
determine that one or more symbols of the scheduled resources are to be unused for the second transmission based at least in part on a cancellation indication received from the base station;
determine that the unused one or more symbols will not be scheduled by the base station as resources in a third transmission based at least in part on:
a capability of the UE,
determining that the one or more symbols are to be unused, and
determining that the second transmission is an uplink transmission and the unused one or more symbols comprise flexible symbols scheduled as uplink symbols for the uplink transmission; and
communicate with the base station based at least in part on determining that the unused one or more symbols will not be scheduled by the base station as resources in the third transmission.

16. The apparatus of claim 15, wherein the instructions are further executable by the processor to cause the apparatus to:
receive, from the base station, the cancellation indication canceling at least one symbol of a slot comprising the one or more symbols of the second transmission, wherein determining that the one or more symbols of the scheduled resources are to be unused for the second transmission is based at least in part on receiving the cancellation indication.

17. The apparatus of claim 16, wherein the instructions are further executable by the processor to cause the apparatus to:
determine the one or more symbols positioned in the second transmission after the at least one symbol of the slot, wherein determining that the one or more symbols of the scheduled resources are to be unused for the second transmission is based at least in part on determining the one or more symbols positioned in the second transmission after the at least one symbol in the cancellation indication.

18. The apparatus of claim 16, wherein the second transmission is an uplink transmission and the cancellation indication is an uplink cancellation indication.

19. The apparatus of claim 16, wherein the second transmission is a first physical uplink shared channel transmission or a first sounding reference signal transmission and wherein determining that the unused one or more symbols will not be scheduled by the base station comprises determining that the unused one or more symbols will not be scheduled for a second physical uplink shared channel transmission or a second sounding reference signal transmission.

20. The apparatus of claim 15, wherein the second transmission has a first priority and the instructions are further executable by the processor to cause the apparatus to:
receive, from the base station, a fourth transmission scheduling at least one symbol of the one or more symbols as resources for the third transmission associated with a second priority different than the first priority, wherein communicating with the base station is based at least in part on receiving the fourth transmission.

21. The apparatus of claim 20, wherein the instructions are further executable by the processor to cause the apparatus to:
determine to not communicate using the scheduled resources of the third transmission based at least in part on the second priority being lower than the first priority, wherein communicating with the base station is based at least in part on determining to not communicate using the scheduled resources of the third transmission.

22. The apparatus of claim 20, wherein the instructions are further executable by the processor to cause the apparatus to:
determine to communicate using the scheduled resources of the third transmission based at least in part on the second priority being higher than the first priority, wherein communicating with the base station is based at least in part on determining to communicate using the scheduled resources of the third transmission.

23. The apparatus of claim 20, wherein the fourth transmission comprises a downlink grant scheduling the resources for a physical downlink shared channel and the second priority corresponds to a physical uplink control channel allocated for transmitting feedback associated with the physical downlink shared channel.

24. The apparatus of claim 15, wherein the instructions are further executable by the processor to cause the apparatus to:
determine that at least a portion of the resources of the second transmission and higher priority resources scheduled by the base station are overlapping, wherein determining that the one or more symbols of the scheduled resources are to be unused for the second transmission is based at least in part on determining that the at least the portion of the resources of the second transmission and the higher priority resources scheduled by the base station are overlapping.

25. The apparatus of claim 24, wherein the instructions are further executable by the processor to cause the apparatus to:
determine the one or more symbols of the second transmission positioned in the second transmission after at least one symbol of the second transmission that is overlapping with the resources of the higher priority resources, wherein determining that the one or more symbols of the scheduled resources are to be unused for the second transmission is based at least in part on determining the one or more symbols of the second transmission.

26. An apparatus for wireless communication at a user equipment (UE), comprising:
means for receiving, from a base station, a first transmission scheduling resources for a second transmission having a first priority;
means for determining that one or more symbols of the scheduled resources are to be unused for the second transmission based at least in part on a cancellation indication received from the base station or a conflict between the scheduled resources for the second transmission and higher priority resources scheduled by the base station;
means for determining that the unused one or more symbols will not be scheduled by the base station as resources in a third transmission based at least in part on:
a capability of the UE,
determining that the one or more symbols are to be unused, and
determining that the second transmission is an uplink transmission and the unused one or more symbols comprise flexible symbols scheduled as uplink symbols for the uplink transmission; and
means for communicating with the base station based at least in part on determining that the unused one or more symbols will not be scheduled by the base station as resources in the third transmission having the first priority.

27. A non-transitory computer-readable medium storing code for wireless communication at a user equipment (UE), the code comprising instructions executable by a processor to:
receive, from a base station, a first transmission scheduling resources for a second transmission having a first priority;
determine that one or more symbols of the scheduled resources are to be unused for the second transmission based at least in part on a cancellation indication received from the base station or a conflict between the scheduled resources for the second transmission and higher priority resources scheduled by the base station;

determine that the unused one or more symbols will not be scheduled by the base station as resources in a third transmission based at least in part on:
   a capability of the UE,
   determining that the one or more symbols are to be unused, and
   determining that the second transmission is an uplink transmission and the unused one or more symbols comprise flexible symbols scheduled as uplink symbols for the uplink transmission; and
communicate with the base station based at least in part on determining that the unused one or more symbols will not be scheduled by the base station as resources in the third transmission having the first priority.

* * * * *